(12) United States Patent
Khov et al.

(10) Patent No.: US 12,647,650 B2
(45) Date of Patent: ***Jun. 2, 2026

(54) CONTENT FILTERING IN MEDIA PLAYING DEVICES

(71) Applicant: SoundHound AI IP, LLC., Santa Clara, CA (US)

(72) Inventors: Thor S. Khov, Santa Clara, CA (US); Terry Kong, Sunnyvale, CA (US)

(73) Assignee: SoundHound AI IP, LLC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/823,308

(22) Filed: Sep. 3, 2024

(65) Prior Publication Data

US 2024/0430526 A1 Dec. 26, 2024

Related U.S. Application Data

(63) Continuation of application No. 18/348,249, filed on Jul. 6, 2023, now Pat. No. 12,126,868, which is a
(Continued)

(51) Int. Cl.
*H04N 21/454* (2011.01)
*G06N 3/045* (2023.01)
(Continued)

(52) U.S. Cl.
CPC ......... *H04N 21/4542* (2013.01); *G06N 3/045* (2023.01); *G06V 20/46* (2022.01); *H04N 21/44008* (2013.01); *H04N 21/4665* (2013.01)

(58) Field of Classification Search
None
See application file for complete search history.

(56) References Cited

U.S. PATENT DOCUMENTS

| | | | |
|---|---|---|---|
| 11,354,900 B1 * | 6/2022 | Li | G06V 10/56 |
| 2008/0138030 A1 | 6/2008 | Bryan et al. | |

(Continued)

FOREIGN PATENT DOCUMENTS

| | | |
|---|---|---|
| EP | 2960906 A1 | 12/2015 |
| KR | 20080006548 A | 1/2008 |
| KR | 20170023858 A1 | 3/2017 |
| KR | 20180071156 A | 6/2018 |

OTHER PUBLICATIONS

Office Action by KIPO of Korean patent application No. 2021-0029150 dated Apr. 1, 2025.

(Continued)

*Primary Examiner* — Omar S Parra
(74) *Attorney, Agent, or Firm* — Platinum Intellectual Property PC

(57) ABSTRACT

Various approaches relate to user defined content filtering in media playing devices of undesirable content represented in stored and real-time content from content providers. For example, video, image, and/or audio data can be analyzed to identify and classify content included in the data using various classification models and object and text recognition approaches. Thereafter, the identification and classification can be used to control presentation and/or access to the content and/or portions of the content. For example, based on the classification, portions of the content can be modified (e.g., replaced, removed, degraded, etc.) using one or more techniques (e.g., media replacement, media removal, media degradation, etc.) and then presented.

18 Claims, 20 Drawing Sheets

Related U.S. Application Data continuation of application No. 17/228,438, filed on Apr. 12, 2021, now Pat. No. 11,736,769.

(60) Provisional application No. 63/012,802, filed on Apr. 20, 2020.

(51) Int. Cl.

| | | |
|---|---|---|
| *G06V 20/40* | (2022.01) | |
| *H04N 21/44* | (2011.01) | |
| *H04N 21/466* | (2011.01) | |

(56) References Cited

U.S. PATENT DOCUMENTS

| | | | | |
|---|---|---|---|---|
| 2018/0249213 | A1 | 8/2018 | Bostick et al. | |
| 2019/0108399 | A1 | 4/2019 | Escorcia et al. | |
| 2020/0143838 | A1* | 5/2020 | Peleg | G06F 18/2413 |
| 2020/0145723 | A1* | 5/2020 | Vaughn | H04N 21/25883 |
| 2020/0242750 | A1 | 7/2020 | Kokkula et al. | |

OTHER PUBLICATIONS

Notice of Preliminary Rejection of Korean counterpart patent application No. 2021-0029150.

Alghowinem_KidsVideos_Sharifa.

Extended Search Report by EPO of the EP application No. 21169531, dated Sep. 13, 2021.

Gupta_DeepPaint.

Hou_Real-timeaudio.

Kavalerov_1905_03330.

Lotfidereshgi_0005394.

Marafioti_1810-12138.

Minaee_2001_05566.

More Martin D et al: "Seamless Nudity Censorship: an Image-to-Image Translation Approach based on Adversarial Training", 2018 International Joint Conference on Neural Networks (IJCNN), IEEE, Jul. 8, 2018 (Jul. 8, 2018), pp. 1-8, XP033419216, DOI: 10.1109/IJCNN.2018.8489407.

Singh_KidsGuard-cam-ready.

Tursun_1912_07183.

Tzinis_1911_07951.

Wehrmann_Neurocomputing2016.

Yang_High-Resolution_Image_Inpainting_CVPR_2017.

AC Arroyo et.al, "Removing rain from images by means of an autoencoder architecture", Mar. 1, 2020.

Second Office Action of Korean counterpart patent application No. 2021-0029150 dated Nov. 1, 2024.

* cited by examiner

600 time freq

602

0 10 20 30 40 50 60 70 80 90 100 110 120 130 140 150

620

624 time

0

3

8

622

701

703 — OBTAIN MEDIA DATA

705 — DETERMINE A CLASSIFICATION OF CONTENT REPRESENTED IN THE MEDIA DATA

707 — IDENTIFY UNDESIRABLE CONTENT

709 — PROCESS THE MEDIA DATA USING A FILTER TO GENERATE FILTERED MEDIA

711 — STORE THE FILTERED MEDIA

1300

Packet format

| header | audio / video payload |

1302

1320

Header format

| time code | credits | DRM | ECC | filter params |

1322   1324   1326   1328   1330

1602

1604

1606

1608

1702

CONTENT FILTERING IN MEDIA PLAYING DEVICES

CROSS-REFERENCES TO RELATED APPLICATIONS

This application is a continuation application of U.S. Non-Provisional patent application Ser. No. 18/348,249 filed Jul. 6, 2023, which is a continuation application of U.S. Non-Provisional patent application Ser. No. 17/228,438 filed Apr. 12, 2021, which claims the benefit of U.S. Provisional Patent Application No. 63/012,802, entitled "CONTENT FILTERING IN MEDIA PLAYING DEVICES" filed Apr. 20, 2020; which is incorporated herein by reference for all purposes.

BACKGROUND

As people are increasingly utilizing a variety of computing devices, including portable devices such as tablet computers and smart phones, it can be advantageous to adapt the ways in which people interact with these devices. For example, users are increasingly consuming audio and video on various interfaces (e.g., a website, an application, etc.) In some instances, portions of the media may include offensive, inappropriate, or undesirable content. A number of conventional content control systems may be utilized to block or remove offensive or inappropriate content. One such approach provided by media providers is a "SafeSearch" mode that provides media access controls in accordance with anyone of a number of preset standards or content classifications. However, some consumers in general and parents, in particular, might prefer a different standard than that provided by the media providers. Further, many conventional content control systems filter an entire video or audio program when only a portion of the program includes offensive, inappropriate, and/or undesirable content. Further still, such approaches do not allow for or at least do not provide for fine granularity of media access control in live media. Accordingly, it is desirable to provide improved techniques for content control systems.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
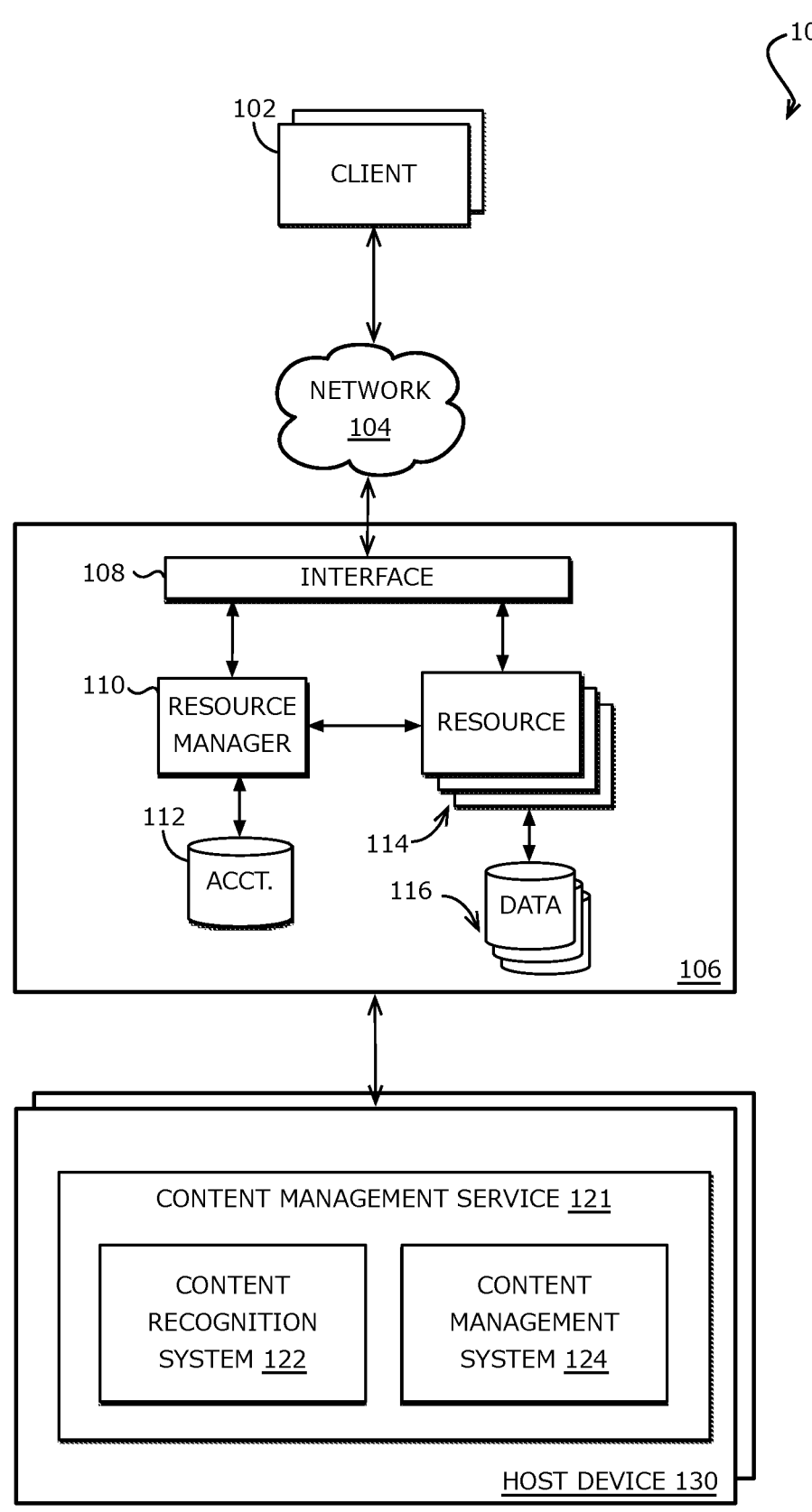
FIG. 1 illustrates an example environment in which aspects of the various embodiments can be implemented.

Systems and methods in accordance with various embodiments of the present disclosure may overcome one or more of the aforementioned and other deficiencies experienced in conventional approaches to content management. In particular, various embodiments enable the identification and classification of content represented in media data (e.g., audio, video, and/or still images) presented on interfaces (e.g., websites and applications including mobile applications, console applications, wearable applications, etc.) using various image recognition, text recognition, audio recognition, among other such approaches. The identification and classification can be used to control presentation and/or access to the content and/or portions of the content.

In an embodiment, media data can be received by a content management service. The content management service can include, for example, components for a content recognition system and components for a content management system, among other such components configured to identify relevant content represented in the media data and control presentation of the content.

Once the media data is received, in certain embodiments, video images or audio spectral frequency ranges that contain the information needed to recognize the undesirable content can be segmented into groups of images and/or audio frames. This may include source identification and source separation within audio and object recognition and vectorization in video. In an embodiment, text represented in video data can be identified or recognized by the content recognition system using an optical character recognition process, a speech-to-text-process can be used to identity spoken words from audio, and various object identification approaches can be used to identify objects.

The content recognition system can compare identified content and/or features representative of the content with defined data (such one or more words or combination of words) and/or to stored features to identify an object in the content. The defined data can be associated with, e.g., offensive, inappropriate (e.g., curse words, offensive vocalizations, explicit visual material, etc.), and/or undesirable content. The content recognition system can attempt to match the identified content with the defined data or some portion of the defined data. In the situation the identified content matches defined data known to be associated with offensive, inappropriate, and/or undesirable content, then the content recognition system can classify the identified content. In certain embodiments, the source of the content (e.g., website, product, application, web content, wearable device, etc.) can be classified as offensive, inappropriate, and/or undesirable as well.

In another example, the content recognition system may utilize classification models, such as appropriately trained neural networks, to detect groups of frames or individual frames with undesirable content. Recognizing certain kinds of undesirable content, such as violent actions or profane words may utilize a model trained with temporal information such as a recurrent neural network or long short-term memory (LSTM) neural network or gated recurrent unit (GRU) neural network.

Based on the classification, the content management system modifies (e.g., replace, remove, obfuscate, etc.) the media using one or more techniques (e.g., media replacement, media removal, media obfuscation, etc.) and presents the modified media. More specifically, the content recognition system reads the original media from an input buffer, process the original media to classify the content, and the content management system generates modified (e.g., filtered) media and writes the modified media to an output buffer. For example, the content management system can utilize the classification (e.g., offensive, inappropriate, undesirable, etc.) of the content to filter (e.g., replace, remove, obfuscate) the content. In an example, sequences of video frames or audio frames containing undesirable content can be blanked or replaced by, for example, overlaying objects in the region of undesirable content such as a smiley face in video or replacing undesirable audio by a specific audio segment such as a bleep or horn.

In another example, approaches provide for erasing segmented regions of undesirable content and perform inpainting using a neural network model to predict information that might exist within the erased region. This would be performed with a generative model such as a generative neural network trained adversarially (GAN). Generative neural networks predict replacement data at points that, in the original media, provide features that enable observers to discern undesirable content. This allows the observers to appreciate content relevant to a story but without the undesirable content such as offensive or distracting objects in video or background or interfering sounds in audio. It should be noted that other signal degradation techniques such as video pixilation or audio garbling may be utilized in accordance with various embodiments described herein.

In yet another example, approaches provide for utilizing an autoencoder to perform semantic analysis of frames or chunks of media, replace one or more undesirable content features if present, and regenerate the media from its encoding.

In certain embodiments, approaches provide for selectable and configurable filters. This is possible by, for example, training a neural network on multiple content types with one or more input that conditionally enables filtering of different types of content. Selectable filters may also be performed by having multiple filter models in sequence, potentially providing menus of hundreds or thousands of user-selectable filters to suit users' comfort level. The filter parameters may be stored on non-volatile memory within the media playing device. Such filters can be updated if, for example, updated filters become available. In an embodiment, the media may be encoded with one or more configurations of filter parameters, such as weight and bias parameters for a neural network with a standard architecture. Accordingly, a media provider can provide media with the full original content encoded once but with an option for users to choose how they want the content filtered.

Instructions for causing a computer system to perform content management in accordance with the present disclosure may be embodied on a computer-readable medium. For example, in accordance with an embodiment, a backend system can store media data obtained from a plurality of content providers. Media data can include audio, video, and/or still images.

The backend system can analyze the media data using various image recognition, text recognition, audio recognition, among other such approaches to identify and classify portions of the content. The identification and classification can be used to control presentation and/or access to the content and/or portions of the content.

Embodiments provide a variety of advantages. For example, in accordance with various embodiments, computer-based approaches for content management can be utilized by content providers, device manufacturers, etc., and consumers of the content providers and device manufacturers. The content management systems and approaches can improve the operation and performance of the computing devices on which they are implemented by, among other advantages, efficiently managing data sets in real-time relating to media data by, for example, collecting and ingesting media data, analyzing the media data using various image recognition, text recognition, audio recognition, among other such approaches to identify and classify portions of the content. The identification and classification can be used to control presentation and/or access to the content and/or portions of the content. The identification and classification and filtering of the classified content can be fine-grained such as being performed at the level of groups of related audio frames or video frames, on individual frames, or specifically on limited regions within frames. Content filtering may be performed in real-time on live media. Furthermore, it can be configurable for different types of content. These systems and approaches may be utilized by content providers, device manufacturers, consumers of the media data, and other entities where content management relating to media data may be needed.

The process can be improved by using computer-based techniques to optimize resource utilization of various resources and processing power in real-time management of media data. In accordance with various embodiments, by providing a system that can preserve the structural integrity of media data when manipulating, indexing, storing, and presenting media data, the system can more efficiently store and process media data. Further, approaches can automatically identify, classify, and process the media data, lowering operational complexity on the computing system, allowing for optimization of computing power, allowing for scalable analysis of media data and lower maintenance costs. Being able to efficiently process media data in real-time allows for real-time content management of prerecorded, live events, and the like. Further still, unlike devices that might read buffered media from sources that are already filtered, implementations of media filtering within media playing devices can operate on original media that contains one or more undesirable types of content. Additionally, unlike media playing devices that perform other types of filtering, such as sharpness enhancement, dithering, and contrast control, the processing of media filtering in media playing devices produces a result in which content of the undesirable type is indiscernible to an observer of the filtered media. It is possible that filtering produces artifacts and that careful inspection of artifacts may provide clues to the fact that the filtered media has been filtered. However, the undesirable content is, itself, indiscernible.

Media playing devices that contain or perform the inventive components or method steps may include specialized media processing chips such as dedicated neural network processing units. Similarly, such dedicated functions may be included within systems-on-chip. The dedicated functions may be performed on video display buffers or audio output buffers directly after all other steps of the processing pipeline.

Various other functions and advantages are described and suggested below as may be provided in accordance with the various embodiments.

FIG. 1 illustrates an example environment 100 in which aspects of the various embodiments can be implemented. In this example, a user can utilize a client device 102 to communicate across at least one network 104 with a resource provider environment 106. The client device 102 can include any appropriate electronic device operable to send and receive requests or other such information over an appropriate network and convey information back to a user of the device. Examples of such client devices 102 include personal computers, tablet computers, smartphones, notebook computers, and the like. The user can include a person authorized to manage the aspects of the resource provider environment The resource provider environment 106 can provide content management services. These services can include, for example, content identification services, content classification services, and content modification services, content presentation services, etc. In certain embodiments, the resource provider of environment 106 can be an intermediary between a customer of a content provider. The resource provider provider can, for example, provide content management resources to consumers of content provided by various content providers. This can include, for example, providing for the ability of a consumer to manage the type of content presented or portions thereof regardless of the provider (i.e., source) of the content. In various embodiments, the content management services can be performed in hardware and software, or in combination thereof.

The network(s) 104 can include any appropriate network, including an intranet, the Internet, a cellular network, a local area network (LAN), or any other such network or combination, and communication over the network can be enabled via wired and/or wireless connections.

The resource provider environment 106 can include any appropriate components for identification and classification of content represented in media data (e.g., audio, video, and/or still images) presented on interfaces (e.g., websites and applications including mobile applications, console applications, wearable applications, etc.) It should be noted that although the techniques described herein may be used for a wide variety of applications, for clarity of presentation, examples relate to content management applications. The techniques described herein, however, are not limited to content management applications, and approaches may be applied to other situations where managing content is desirable, such as radio broadcast, live events, etc.

The resource provider environment 106 might include Web servers and/or application servers for obtaining and processing media data to identify and classify content represented in the media data, where the identification and classification can be used to control presentation and/or access to the content and/or portions of the content. While this example is discussed with respect to the internet, web services, and internet-based technology, it should be understood that aspects of the various embodiments can be used with any appropriate services available or offered over a network in an electronic environment.

In various embodiments, resource provider environment 106 may include various types of resources 114 that can be used to facilitate content management services. The resources can facilitate, for example, content recognition system 122, content management system 124, application servers operable to process instructions provided by a user or database servers operable to process data stored in one or more data stores 116 in response to a user request.

Content recognition system 122 is operable to obtain media data and identify relevant information represented in the media data. Content recognition system 122 or an associated component compares identified content and/or features representative of the content with defined data (such one or more words or combination of words) and/or to stored features to identify an object in the content. The defined data can be associated with, e.g., offensive, inappropriate (e.g., curse words, offensive vocalizations, explicit visual material, etc.), and/or undesirable content. Content recognition system 122 attempts to match the identified content with the defined data or some portion of the defined data. In the situation the identified content matches defined data known to be associated with offensive, inappropriate, and/or undesirable content, then content recognition system 122 can classify the identified content. In certain embodiments, the source of the content (e.g., website, product, application, web content, wearable device, etc.) can be classified as offensive, inappropriate, and/or undesirable as well. The content recognition system 122 is described in greater detail below in reference to FIG. 4.

Content management system 124 is operable to utilize the classification (e.g., offensive, inappropriate, undesirable, etc.) of the content to determine whether the content should be replaced, removed, obfuscated, etc.

The resources may be hosted on multiple server computers and/or distributed across multiple systems. Additionally, the components may be implemented using any number of different computers and/or systems. Thus, the components may be separated into multiple services and/or over multiple different systems to perform the functionality described herein. In some embodiments, at least a portion of the resources can be "virtual" resources supported by these and/or other components.

In at least some embodiments, an application executing on the client device 102 that needs to access resources of the provider environment 106, for example, to initiate an instance of content management service 121 can submit a request that is received to interface layer 108 of the provider environment 106. The interface layer 108 can include application programming interfaces (APIs) or other exposed interfaces, enabling a user to submit requests, such as Web service requests, to the provider environment 106. Interface layer 108 in this example can also include other components as well, such as at least one Web server, routing components, load balancers, and the like.

When a request to access a resource is received at the interface layer 108 in some embodiments, information for the request can be directed to resource manager 110 or other such systems, service, or component configured to manage user accounts and information, resource provisioning and usage, and other such aspects. Resource manager 110 can perform tasks such as communicating the request to a management component or other control component which can be used to manage one or more instances of a content management service as well as other information for host machines, servers, or other such computing devices or assets in a network environment, authenticate an identity of the user submitting the request, as well as to determine whether that user has an existing account with the resource provider, where the account data may be stored in at least one data store 112 in the resource provider environment 106.

For example, the request can be used to instantiate content management service 121 on host machine 130. The service (e.g., content management service) can utilize content recognition system 122 and content management system 124 to identify and classify content represented in media data presented on interfaces (e.g., websites and applications including mobile applications, console applications, wearable applications, etc.) using various image recognition, text recognition, audio recognition, among other such approaches. The identification and classification can be used to control presentation and/or access to the content and/or portions of the content. It should be noted that although host machine 130 is shown outside the provider environment, in accordance with various embodiments, one or more modules of content management service 121 can be included in provider environment 106, while in other embodiments, some of the components may be included in the provider environment. It should be further noted that host machine 130 can include or at least be in communication with other components, for example, a content training and classification systems, image analysis systems, audio analysis systems, etc.

Figure 2:
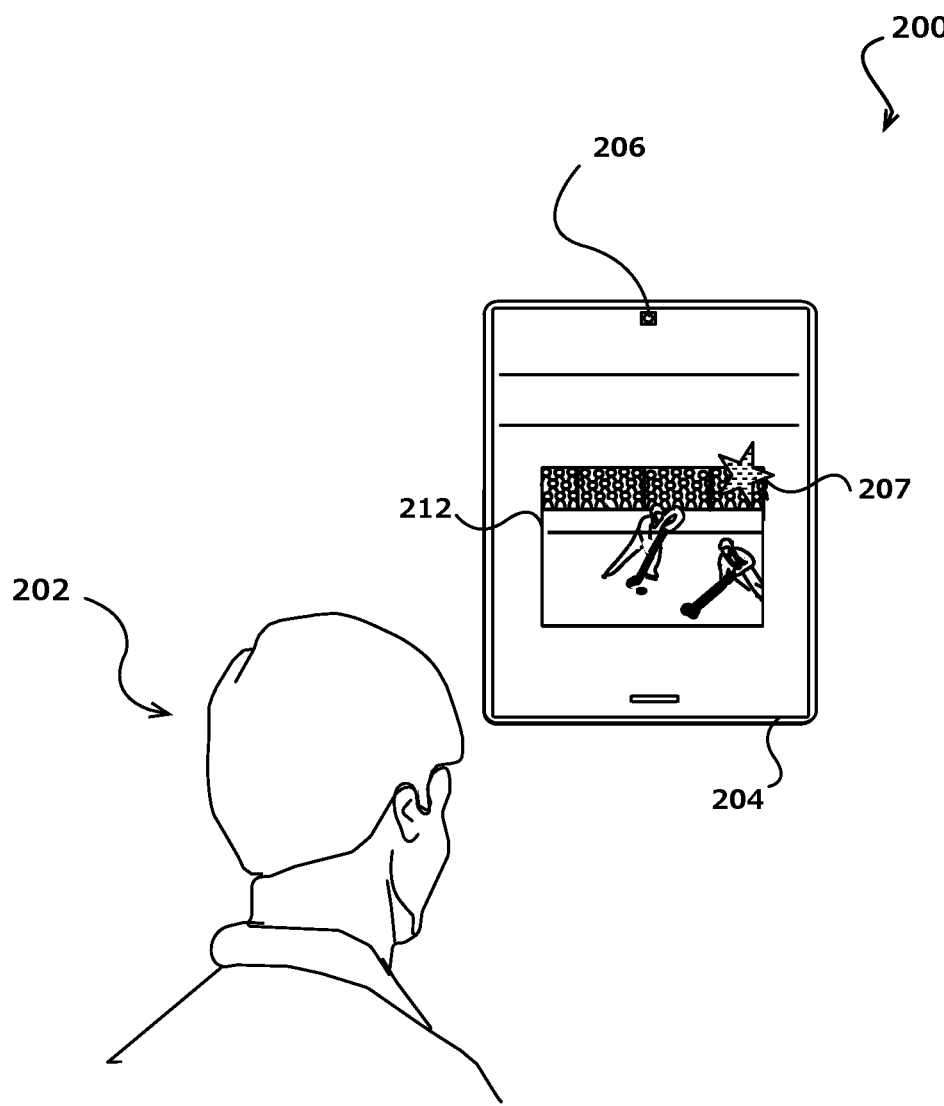
FIG. 2 illustrates alternate example environment in which aspects of the various embodiments can be utilized.

FIG. 2 illustrates an example situation 200 wherein a user 202 is interacting with a computing device 204. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, televisions, notebook computers, personal data assistants, video gaming consoles or controllers, portable media players, and wearable computers (e.g., smart watches, smart glasses, etc.) among others. In this example, the computing device 204 includes a camera 206 operable to perform functions such as image and/or video capture. The device can include additional image capture elements as well, and may include at least one other camera, a charge-coupled device (CCD), a motion detection sensor, or an infrared sensor, among others.

The device can render an interface such as an application interface that can present content. The content can include text, images, video 212, audio, etc. As described, consumers observe a lot of content on devices that play audio media and video media. Many of these consumers wish that certain content will not be presented on their devices. For example, many parents of children wish that pornographic images, obscene speech, and violent images will not be presented.

Content providers of media created by large numbers of third parties apply generally accepted standards for blocking or removing media that has offensive or inappropriate content, such as pornographic or extremely violent content. These content providers may even provide optional levels of media blocking with a feature such as a SafeSearch mode. However, some consumers in general and parents, in particular, might prefer a different standard than that set by the media providers. For example, some parents might want to allow nudity presented as part of high-brow art or scientifically educational media while other parents might not approve. Some parents might find the sounds of gunshots and images of guns inappropriate and others might find sounds and videos of boxing to be inappropriate. Some might consider a set of certain words to be inappropriate.

Content providers offering limited amounts of curated media, such as Netflix for movies and television shows and Audible for audiobooks, provide different access for different account types. Consumers can sign up for special accounts, such as ones for kids, that offer more limited programs than is available to general accounts. Some media, such as broadcast television shows, are encoded with a rating such as the Motion Picture Association of America (MPAA) film rating systems. Some television sets can detect the encodings. Such television sets allow users to set parental control settings that prevent media from being displayed if its rating is above a certain level. However, the above content control systems operate at the level of full video or audio programs. That is, consumers cannot access certain media if even a small portion has content that an organization has deemed inappropriate. Further, in the situation the media as a whole is determined acceptable, content considered inappropriate by a consumer may unfortunately be displayed, including, for example, an inappropriate hand gesture, facial gesture, etc., as represented by 207.

In another example, many real dogs, when they see dogs on a display or hear audio of dogs growling or barking, will begin to bark. This can annoy neighbors. Some dog owners would like to prevent images and sounds of dogs from being presented on their media devices. In yet another example, with audio or video chats between consumers, there is no content control, and it is possible for a user presenting audio or video to present content that observers listening to or viewing would find undesirable.

Accordingly, approaches in accordance with various embodiments enable interfaces (e.g., websites, applications, etc.) and/or content included in those interfaces to be classified based on image identification, audio identification, and/or text recognition, and for content to be restricted and/or access to such content to be controlled based at least in part on the classification. In particular, approaches described herein address the problems above.

Figure 3:
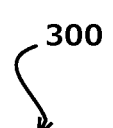
FIG. 3 illustrates an example content management system in accordance with various embodiments.
Figure 3:
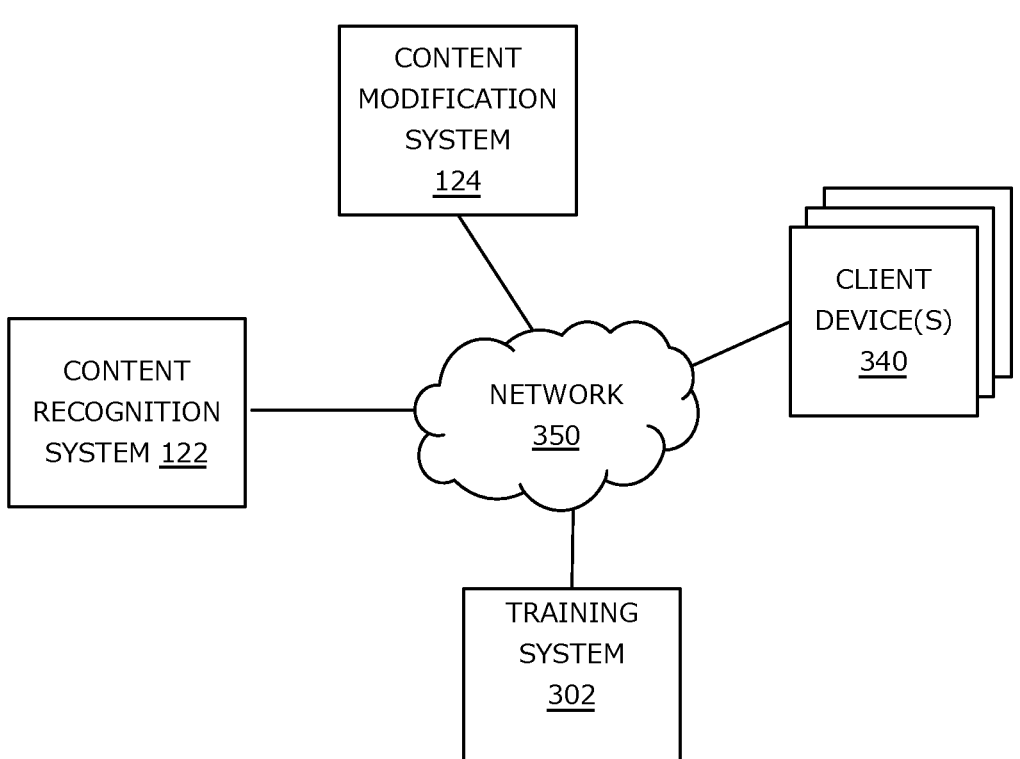

FIG. 3 illustrates an exemplary embodiment 300 of a content management system according to an embodiment. It should be understood that reference numbers are carried over between figures for similar components for purposes of simplicity of explanation, but such usage should not be construed as a limitation on the various embodiments unless otherwise stated. The system includes content recognition system 122, content modification system 124, training system 302, client devices 340, and a network 350 over which the various systems communicate and interact. The various computing devices described herein are exemplary and for illustration purposes only. The system may be reorganized or consolidated, as understood by a person of ordinary skill in the art, to perform the same tasks on one or more other servers or computing devices without departing from the scope of the invention.

Content recognition system 122 is operable to obtain media data from various sources. Media data may include audio data, video data, image data, text, etc. Sources may include one or more content providers.

Content recognition system 122 in certain embodiments can segment undesirable content into groups of images, audio data, and/or text. Content recognition system 122 can compare identified content and/or features representative of the content with defined data (such one or more words or combination of words) to stored features to identify an object in the content. The defined data can be associated with, e.g., offensive, inappropriate (e.g., curse words, offensive vocalizations, explicit visual material, etc.), and/or undesirable content. The content recognition system can attempt to match the identified content with the defined data or some portion of the defined data. In the situation the identified content matches defined data known to be associated with offensive, inappropriate, and/or undesirable content, then the content recognition system can classify the identified content. In certain embodiments, the source of the content (e.g., website, product, application, web content, wearable device, etc.) can be classified as offensive, inappropriate, and/or undesirable as well.

In an embodiment, content recognition system 122 may utilize classification models, such as appropriately trained neural networks, to detect groups of frames or individual frames with undesirable content.

Content modification system 124 is operable to modify (e.g., replace, remove, obfuscate, degrade etc.) the media data and present the modified media data. More specifically, the content recognition system reads the original media data from an input buffer, processes the original media data to classify the content, generates modified (e.g., filtered) media data, and writes the modified media data to an output buffer. For example, content modification system 124 can utilize the classification (e.g., offensive, inappropriate, undesirable, etc.) of the content to filter (e.g., replace, remove, obfuscate) the content. In an example, sequences of video frames or audio frames containing undesirable content can be blanked or replaced by, for example, overlaying objects in the region of undesirable content such as a smiley face in video or replacing undesirable audio by a specific audio segment such as a bleep or horn. In another example, approaches provide for erasing erasuring segmented regions of undesirable content and perform inpainting using a neural network model to predict information that might exist within the erased region. This allows the observers to appreciate content relevant to a story but without the undesirable content such as offensive or distracting objects in video or background or interfering sounds in audio. It should be noted that other signal degradation techniques such as video pixelation or audio garbling may be utilized in accordance with various embodiments described herein. In yet another example, approaches provide for utilizing an autoencoder to perform semantic analysis of frames or chunks of media, replace one or more undesirable content features if present, and regenerate the media from its encoding.

Training system 302 is operable to train models that, when used to evaluate media data, identify undesirable content and/or modify media data including undesirable content. In an embodiment, a model can be trained using audio and image data labeled with undesirable content to recognize undesirable content. For example image data labeled with undesirable content can be used to train a model to recognize instances of undesirable content in image data. In another example, images of audio (e.g., spectrum images) of undesirable content can be used to train a model to recognize instances of undesirable audio data. After training to recognize undesirable content within media, an appropriately trained model generates a feature vector that can be used to identify the undesirable content. In certain embodiments, the feature vector can represent the type of undesirable content by, for example, having one or more vector dimensions that predict the presence of a corresponding one or more type of content. In various embodiments, a trained model can be evaluated on visual media data and the trained model can generate a bounding box that includes the undesirable content.

In accordance with an embodiment, the trained model can include a generative filter. A generative filter, such as one built on a generative neural network, is one that produces media as output. A common approach to training generative neural networks is adversarial training, which produces generative adversarial networks (GAN). A generative filter can produce output that is discernibly the same as its input if no undesirable content is present but different from the input if undesirable content is present in such a way that the undesirable content is indiscernible.

Client devices 340 may include, generally, a computer or computing device including functionality for communicating (e.g., remotely) over a network 350. Data may be collected from client devices 340, and data requests may be initiated from each client device 340. Client device(s) 340 may be a television, a desktop computer, a laptop computer, personal digital assistant (PDA), a smart phone or other cellular or mobile phone, or mobile gaming device, among other suitable computing devices. Client devices 340 may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over a network 350.

In particular embodiments, each client device 340 may be an electronic device including hardware, software, or embedded logic components or a combination of two or more such components and capable of carrying out the appropriate functions implemented or supported by the client device 340. For example and without limitation, a client device 340 may be a desktop computer system, a notebook computer system, a netbook computer system, a handheld electronic device, or a mobile telephone. The present disclosure contemplates any client device 340. A client device 340 may enable a network user at the client device 340 to access the network 350. A client device 340 may enable its user to communicate with other users at other client devices 340.

A client device 340 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A client device 340 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the client device 340 one or more Hyper Text Markup Language (HTML) files responsive to the HTTP request. The client device 340 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The client device 340 may also include an application that is loaded onto the client device 340. The client device 340 obtains data from the network 350 and displays it to the user within the application interface.

Exemplary client devices are illustrated in some of the subsequent figures provided herein. This disclosure contemplates any suitable number of client devices, including computing systems taking any suitable physical form. As example and not by way of limitation, computing systems for client devices may be an embedded computer system, a system-on-chip (SOC), a single-board computer system (SBC) (such as, for example, a computer-on-module (COM) or system-on-module (SOM)), a desktop computer system, a laptop or notebook computer system, a mobile telephone, a personal digital assistant (PDA), or a combination of two or more of these. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 350 generally represents a network or collection of networks (such as the Internet or a corporate intranet, or a combination of both) over which the various components illustrated in FIG. 3 (including other components that may be necessary to execute the system described herein, as would be readily understood to a person of ordinary skill in the art). In particular embodiments, network 350 is an intranet, an extranet, a virtual private network (VPN), a local area network (LAN), a wireless LAN (WLAN), a wide area network (WAN), a metropolitan area network (MAN), a portion of the Internet, or another network 350 or a combination of two or more such networks 350. One or more links connect the systems and databases described herein to the network 350. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 350, and any suitable link for connecting the various systems and databases described herein.

The network 350 connects the various systems and computing devices described or referenced herein. In particular embodiments, network 350 is an intranet, an extranet, a virtual private network (VPN), a local area network (LAN), a wireless LAN (WLAN), a wide area network (WAN), a metropolitan area network (MAN), a portion of the Internet, or another network 350 or a combination of two or more such networks 350. The present disclosure contemplates any suitable network 350.

One or more links couple one or more systems, engines or devices to the network 350. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 350.

In particular embodiments, each system or engine may be a unitary server or may be a distributed server spanning multiple computers or multiple datacenters. Systems may be of various types, such as, for example and without limitation, web server, advertising server, file server, application server, or proxy server. In particular embodiments, each system may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 3, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 4:
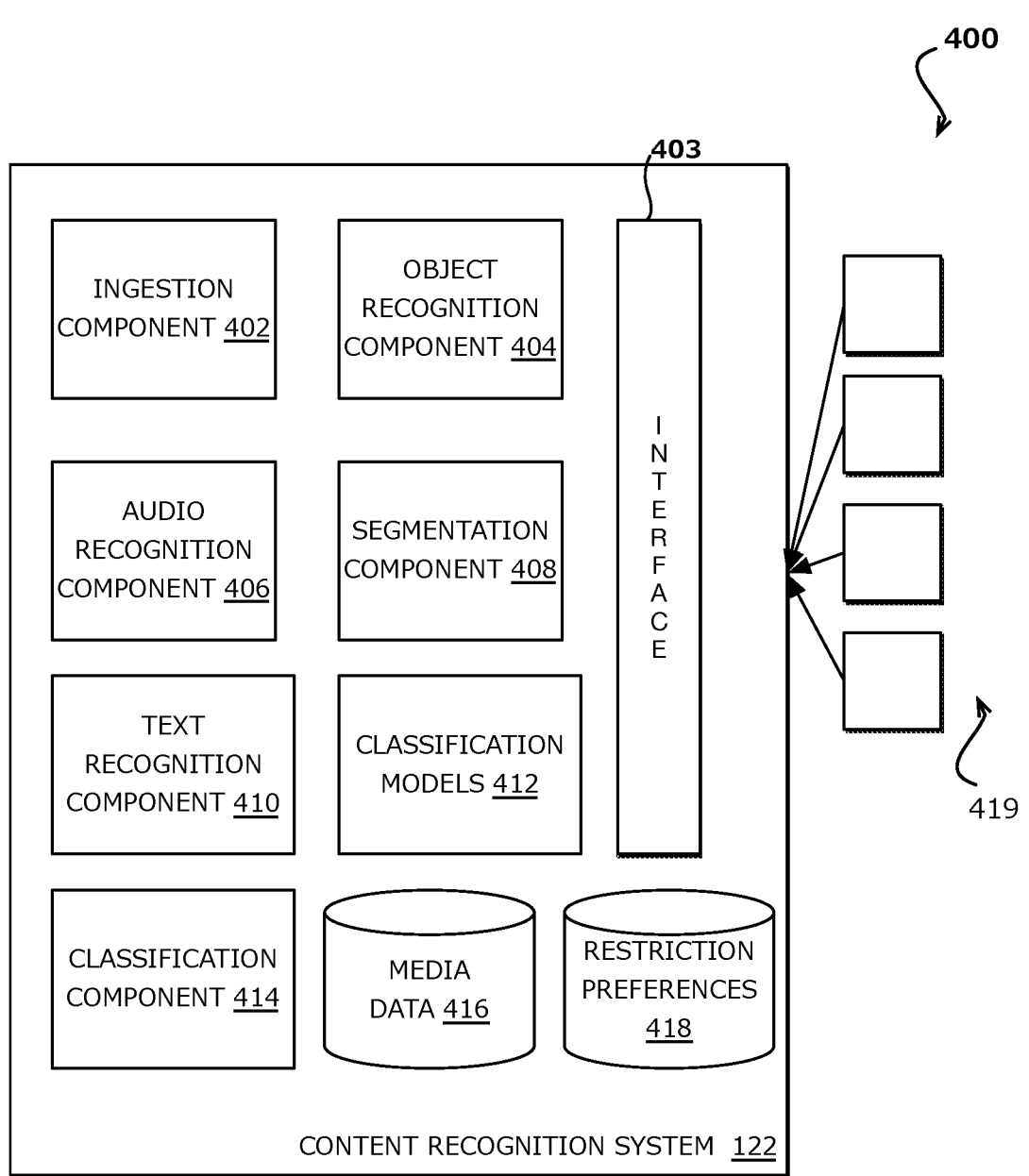
FIG. 4 illustrates an example content recognition system in accordance with various embodiments.

FIG. 4 illustrates an exemplary embodiment 400 of the content recognition system 122. The content recognition component can be implemented using software and/or hardware and can be configured to receive the content (or data representative of the content). Content recognition system 122 can include ingestion component 402, object recognition component 404, audio recognition component 406, text recognition component 410, segmentation component 408, classification models 412, classification component 414, restriction preferences data store 418, and media data store 416.

Ingestion component 402 is operable to obtain media data from various sources 419 through interface 403. The media data may include audio data, video data, image data, text, etc. Sources may include one or more content providers. Content providers can include, for example, users, movie agencies, broadcast companies, cable companies, internet companies, etc. Once the sources are identified, a variety of methodologies may be used to retrieve the relevant media data via interface 403, including but not limited to, data scrapes, API access, etc. The media data can be stored in media data store 416.

In various embodiments, interface 403 may include a data interface and a service interface that may be configured to periodically receive media data. Interface 403 can include any appropriate components known or used to receive requests or other data from across a network, such as may include one or more application programming interfaces (APIs) or other such interfaces for receiving such requests and/or data.

Object recognition component 404 can, for example, perform one or more image matching approaches as is used in computer vision, object recognition, motion tracking, three-dimensional (3D) modeling, and the like, which can be performed to identify relevant objects that may represent undesirable content. Example approaches include face and human detection, apparel recognition, deep learning approaches, among other such approaches.

In accordance with various embodiments, object recognition component 404 can receive, for example, media data from media data store 416 including, for example, video and/or other data. In this example, the content is video data. It should be noted that in some embodiments, an image can include a picture, a video frame that is a part of a video, and/or an animation frame that is a part of an animation. For example, one or more frames can be extracted or sampled from the video and/or animation to make up the one or more images.

Segmentation component 408 can segment the video data into one or more reference frames or keyframes. A reference frame can be, for example, an image that represents a summary of a portion of video data. In accordance with various embodiments, a video frame, for example, can be any basic sub-unit of a larger item or collection of digital media. For instance, video data can be a sequence of still images, and each still image can be a frame. Similarly, a collection of images can be viewed conceptually as a sequence of still images, similar to that of video data. For such a sequence, or collection, each single image can be a frame. For streams, documents, or document collections consisting of audio, text, and/or other digital media, a frame can be a subset of the collection. Such types of media may be divided into sub-units of any length for analysis. In these examples, frames can include audio or text excerpts from longer streams. It should be noted that the use of frame herein is not intended to be limited to digital video or collections of digital images, and is used to refer to any sub-unit of any form of digital media.

A segment or shot can be a set of frames from a larger item or collection of digital media. For example, digital media, can be segmented into groups of frames according to various criteria to facilitate browsing and navigation. A segment may be any portion or subset of a larger item or collection of digital media. Alternatively, a segment could also be the entire item of digital media. For example, a segment may be a collection of digital images, or any portion of a digital video, regardless of its source or length (including the entire video). A keyframe or reference frame is a frame that is selected from a segment (set of frames) as a representative for that segment of digital media. A reference frame or keyframe can be a representative frame of the segment or shot.

Segmenting video can include, for example, using video analysis and related algorithms to identifies 'shots.' A shot can be a contiguous sequence of frames that are largely similar, visually. Similar video is video that includes at least a minimum level feature of descriptors or other features that match between frames at least by a threshold amount. For example, if a video shows two people talking in a restaurant, there may be one camera on person A, and another on person B, and perhaps a third showing both in profile facing one another at the table. A shot would typically be a segment from one of those cameras, usually as that person is talking.

Shots can be identified by, for example, computing an overall similarity metric between individual frames of video based on the pixel values at each position, and then applying a threshold which, when crossed, indicates a new shot has been entered.

Once shots have been determined, they can be compared for overall similarity. In the example above, the shots from the camera on person A will generally be more similar to one another than any are to shots from the other two cameras. Shots from the three different cameras may then be assigned a label, a, b, or c, and there is a pairwise similarity metric between shots.

In accordance with various embodiments, the selection of a reference frame or keyframe from the segment or shot can be accomplished in a number of ways. At least some approaches can begin with the decomposition of the video into temporal segments (e.g., shots or scenes) and then extract a number of keyframes per temporal segment. For example, in accordance with an embodiment, the selection of the middle frame of each shot may can be designated the reference frame. In another example, low-level visual information of all video frames (or all shot frames or all scene frames) can be used to group frames using, e.g. k-means, and then frames can be selected as reference frames that are more similar to the groups centers of the groups. In another example, the video can be decomposed into segments based on inter-frame cosine similarity and the keyframes can be selected with k-means where k can be proportional to the length in time of the segment.

Once the keyframes are determined, the keyframes can be analyzed to identify content, and in particular, undesirable content. For example, in some embodiments, object recognition component 404 can be configured to perform an object recognition process with respect to the video. For example, faces, products, music album covers, book covers, shapes, colors, and/or other objects included in an image can be recognized using the object recognition process. For example, in some embodiments, a feature detection, computer vision, corners detection, or other such algorithm or process can be used to process image data in order to determine whether undesirable content is represented in the image data. More specifically, in order to detect undesirable content, at least some embodiments can utilize approaches or algorithms that utilize local features or other such representative points to represent a pattern. Accordingly, video data or other content can be analyzed to extract feature descriptors of features from the video data and visual words can be assigned. These features then can be used in a search vocabulary and a list of potential words created. For example, a matching process then can attempt to compare images based on the distribution of different visual words present in representative swatches, using a bag of words description. Each determined visual word can then be compared against groups of visual words stored in an index of visual words by a search engine in a manner similar to that employed by text retrieval techniques. As a result, a group of closest matching index images that at least partially match the local features can be determined based at least in part upon matching visual words. Similarly, in a machine-learned embodiment, features can be represented by embeddings in a learned space and the vocabulary comprises embeddings or points within the space that represent undesirable content.

In various other embodiments, video content can be transformed into feature descriptors and compared to stored feature descriptors. For example, in the situation where content includes video data, the system can extract features from each of the images using a feature extraction algorithm (e.g., Accumulated Signed Gradient) and transform the extracted features for each image into feature descriptors which can be compared against stored feature descriptors. In this way, typical image matching algorithms can take advantage of the fact that an image of an object, frame or scene contains a number of feature points (e.g., specific points in an image that are robust to changes in image rotation, scale, viewpoint or lighting conditions).

In various embodiments, the descriptor determination can include functionality to analyze a color palette, lighting, audio fingerprint, and other elements of the video while processing the videos. In this respect, the content recognition service can be based on groupings that are not solely object driven but rather based on groupings with a common color scheme, audio fingerprint or other related aspects. The descriptors are compared against the correlated descriptors stored in descriptor database. Matching scores can be determined and returned for each of the comparisons. In this example, each of the matching scores represents a confidence for how well a one of the determined descriptors matches a stored descriptor. The comparison with the highest matching score is identified as a match and can identified and undesirable content.

In another example, the object recognition component 404 may utilize classification models 412, such as appropriately trained neural networks, to detect groups of frames or individual frames with undesirable content. Recognizing certain kinds of undesirable content, such as violent actions or profane words may utilize a model trained with temporal information such as a recurrent neural network or long short-term memory (LSTM) neural network or gated recurrent unit (GRU) neural network. Classification models, such as CNNs, can recognize not just the fact that undesirable content is present in media, but the location and size of the undesirable content within the media. In the context of audio, this would be the recognition of what frequency bands contain the information that is useful to recognize the undesirable content. In the context of video, this would be the recognition of the location and range, horizontally and vertically, within a frame that undesirable content is present. In the field of digital cameras, detecting the locations and sizes of faces are well known and enables more accurate focus and image enhancements.

One approach to recognizing the location and size of undesirable content is to use a classifier CNN and, starting from the highest layer and going downward, finding which features in the next lower layer had the greatest contribution to the classification result. At the lowest layer, the midpoint and range of input features that contributed to the classification result with a contribution above a threshold, define the location and size of the undesirable content. The contributing input features might be non-contiguous. This is especially so for audio frequency components. It may be desirable to disregard outliers to avoid unreasonably large replacement objects. It may also be desirable to compare size and location results to those of multiple previous frames with an expectation that they will have deltas representing a reasonably consistent trajectory of motion. This avoids jumpiness in size and motion of replacement objects.

In certain embodiments, video content can be analyzed using a text recognition component 410 to identify text such as logo, brands, etc. that may include undesirable content. For example, the text recognition component 410 can be configured to perform an optical character recognition (OCR) process with respect to the content. For example, words or characters included in an image that are not yet machine-encoded can be converted into machine-encoded (i.e., machine-readable) text using the OCR process.

The audio recognition component 406 can, for example, receive audio and can attempt to recognize or identify one or more audio portions included in the audio content item. In one example, the audio recognition module can be configured to perform a speech recognition process, such as a speech-to-text process, in attempt to recognize/identify one or more words included in the audio content that are undesirable.

Accordingly, information (e.g., feature descriptors, individual words, combinations of words, phrases, etc.) determined from the content recognition system 122 can be used to classify the content or source of the content in the video and/or other data. For example, the information can be received at classification component 414. Classification component 414 can attempt to classify or label the identified content and/or the source(s) of the content (e.g., images, audio, text, video) based at least in part on the word(s) or phrases identified in that content, and/or other distinguishing features. In some instances, a library or database can store a set of already defined data such as a set of defined words, phrases, feature descriptors, etc. The defined data can be already known, labeled, classified, preset, preconfigured, etc., to be associated with a particular classification or label. In some embodiments, the classifier can compare the identified content portion(s) against the defined data, in order to identify one or more pieces of defined data that substantially match (i.e., match within an allowable deviation) the identified content portion(s).

For example, in one example, a match between an identified word or descriptor or other information and a first piece of classified information that corresponds to undesirable content can result in classifying the identified content in the video data as being associated with undesirable content. In another example, a second piece of defined data can correspond to audio representing spoken undesirable content, such as single words, multiple words, phrases and or combinations thereof. As such, the audio can be labeled or classified as being associated with undesirable content. It is further contemplated that a person of ordinary skill in the art would recognize other variations, examples, and/or embodiments of defined data (i.e., definitions) within the scope of the present disclosure. For example, an image can be considered undesirable as well as any text on the image and an audio file can include offensive sounds as well as offensive spoken content.

In accordance with various embodiments, a restriction level stored in restriction preference data store 418 based on one or more factors can be utilized to determine a classification of the content, where a high restriction level can indicate a situation where content should be limited to appropriate content (e.g., little to no objectionable content) and a low restriction level can indicate a situation where little to no restriction is required for the content. Various other restrictions levels can also be applied. Content providers and/or certain users of the device (e.g., authorized users) can indicate a desired restriction level or indicate factors or other circumstances that can be used to determine a classification of the content for a particular user. For example, restriction preferences can be associated with user accounts and/or content providers. The restriction preferences can indicate undesirable content. The undesirable content indicated by the restriction preferences can map to one or more content filters. In various embodiments, the factors that influence the restriction level can include at least one of user provided filter preferences, a type of consumer of the content (e.g., a user of the device), a location of where the content is being consumed (e.g., school, library, home, etc.), a time of day the content is consumed (e.g., during working hours, during school hours, etc.), an establishment of where the content is being consumed, etc. The type of consumer can be determined by, for example, the consumer's age, occupation, gender, etc. Location can include, for example, a geographic location (e.g., city, state, country). An establishment can include, for example, a public establishment (e.g., a library, a school, and an airport, etc.), a private established such as a person's home, etc. Accordingly, the classification component 414 can classify the content based at least in part on the restriction level.

Figure 5:
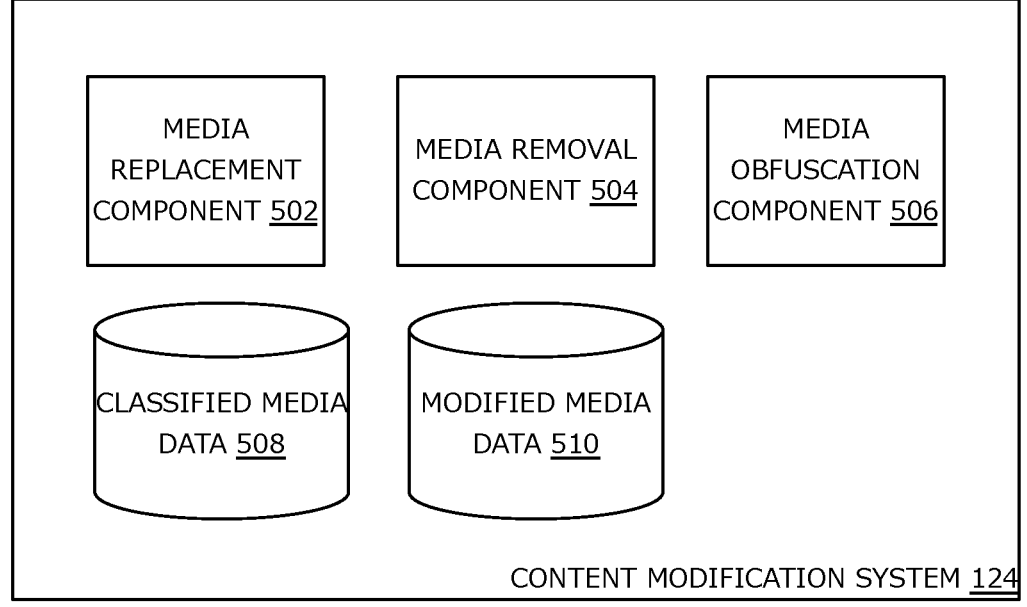
FIG. 5 illustrates an example content modification system in accordance with various embodiments.

FIG. 5 illustrates an exemplary embodiment of the content modification system 124. The content modification system 124 is operable to modify (e.g., replace, remove, obfuscate, etc.) the media. In this example, the content modification system 124 includes media replacement component 502, media removal component 504, media obfuscation component 506. As described, content recognition system 122 reads the original media from an input buffer or data store 416, processes the original media to classify the content. The classified content can be stored in classified media data store 508. Content modification system 124 obtains the classified media data and generates modified (e.g., filtered) media and writes the modified media to an output buffer such as modified media data store 510.

Some embodiments function with some of the components such as by performing one of media replacement, media removal, or media obfuscation. For example, the content modification system 124 can utilize the classification (e.g., offensive, inappropriate, undesirable, etc.) of the content to filter (e.g., replace, remove, obfuscate) the content. In an example, media replacement component 502 is operable to replace sequences of video frames or audio frames containing undesirable content replaced by, for example, overlaying objects in the region of undesirable content such as a smiley face in video or replacing undesirable audio by a specific audio segment such as a bleep or horn. In accordance with various embodiments, a blending algorithm at the edges of the replacement object can make its placement appear more natural. Blending can be by a process of blurring and/or sharpening in an image or frequency component amplitude matching within audio frames.

Media removal component 504 is operable to erase segmented regions of undesirable content and perform inpainting using a neural network model to predict information that might exist within the erased region. This can be performed with a generative model such as a generative neural network trained adversarially (GAN). Generative neural networks predict replacement data at points that, in the original media, provide features that enable observers to discern undesirable content. This allows the observers to appreciate content relevant to a story but without the undesirable content such as offensive or distracting objects in video or background or interfering sounds in audio. It should be noted that other signal degradation techniques such as video pixelation or audio garbling may be utilized in accordance with various embodiments described herein. In yet another example, approaches provide for utilizing an autoencoder to perform semantic analysis of frames or chunks of media, replace one or more undesirable content features if present, and regenerate the media from its encoding. To perform content filtering, it is possible to use the location and size information of undesirable content to apply a replacement object as a patch overlay. To do so, the filter reads the data representing the replacement object from a replacement object database. This would be an overlay of an object that is not undesirable content. It is possible to define mappings between particular types of undesirable content and particular overlay objects. For example, an undesirable word could be replaced with a desirable word.

Media obfuscation component 506 is operable to make undesirable content indiscernible. One way to make undesirable content indiscernible is to replace the full media signal during time periods in which the indiscernible content is discernible. In the context of video, signal replacement is the replacement of video frames. In the context of audio, signal replacement can be the replacement of a range of audio samples in the time domain or the replacement of frequency components within frames of audio in the frequency domain.

Figure 6A:
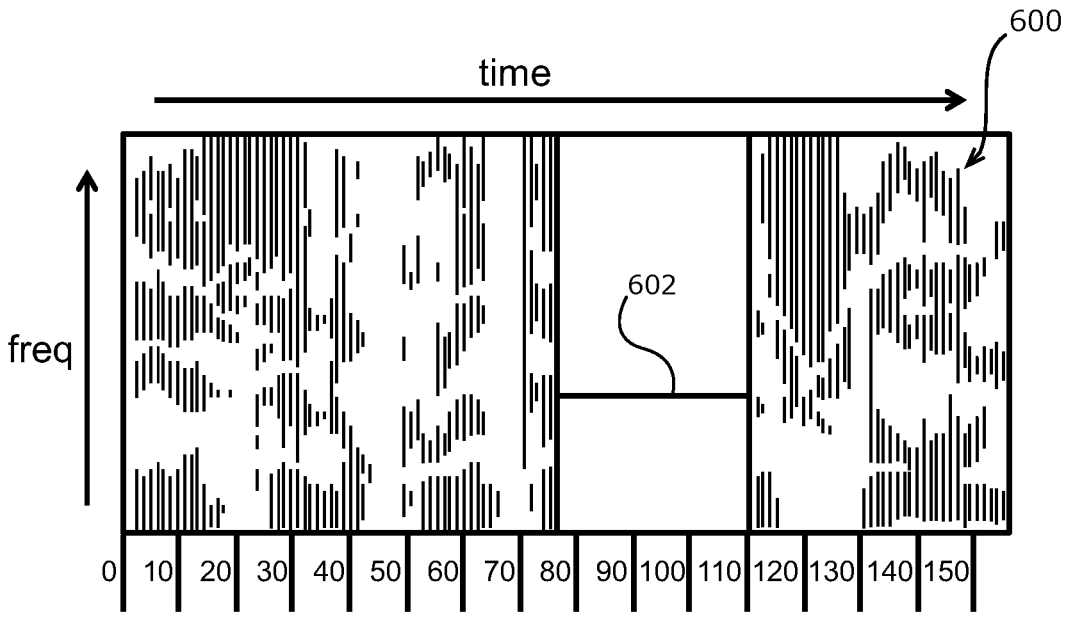
FIG. 6A illustrates an example spectrogram of audio frames with signal replacement according to an embodiment.

FIG. 6A illustrates a frequency domain spectrogram 600 of filtered audio containing speech in accordance with various embodiments. As shown, time is illustrated left to right from audio frame 0 to audio frame 156. Frequency is illustrated low to high. The spectrogram shows the intensity of the frequency components at each frame. A common frame rate for audio, especially speech processing, is 100 frames per second. Therefore, the spectrogram of FIG. 6A is showing 1.56 seconds of speech. A typical speech rate is about 5 words per second, so this spectrogram shows approximately 8 average-length words.

An LSTM content filter trained to recognize undesirable sound content can be evaluated on the data shown in the spectrogram. In this example, an undesirable phrase of profanity that is approximately two works long is recognized at frame 77. The filter renders the speech indiscernible. In this example, the filter replaces all audio in frames 77 through 111 with a single frequency. That is notable by horizontal line 602 during that range of frames. This would produce a sine wave output during those frames. A sine wave in the middle of a range of speech is commonly referred to as a bleep. FIG. 6A shows automatic bleeping of undesirable audio content by a neural content filter.

It is not necessary to create a bleep. Another reasonable behavior is to mute the sound. This would produce a spectrogram with a blank rectangle. Another reasonable behavior is to create white noise, which would create an evenly filled rectangle within the spectrogram. Other types of filling information are reasonable as replacements for the frames that contained undesirable sound content in the original media.

Figure 6B:
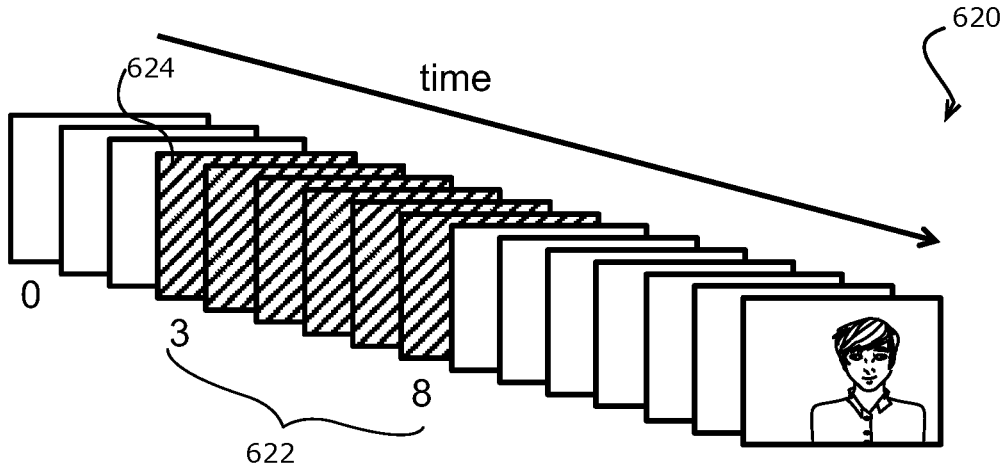
FIG. 6B illustrates an example sequence of video frames with frame replacement according to an embodiment.

In an embodiment, sound from the original media may be preserved and the audible information that a listener would recognize as an undesirable word removed. For example, FIG. 6B illustrates a sequence of frames 620 of filtered video content containing an image of a person in accordance with various embodiments. In this example, time is illustrated left to right from frame 0 to frame 15. At a common frame rate of 30 frames per second, this represents 0.533 seconds of video. An LSTM content filter trained to recognize undesirable visual content evaluates the data in the frames. In an embodiment, at frame 3, an undesirable visual element is recognized. The undesirable visual element is shown for six frames (0.2 seconds). The six frames 622 include a representation of a hand making an obscene gesture or performing a violent action. In this example, the content filter is configured to mask frames three to eight by replacing them with frames that have a simple pattern 624 across the full frame. It should be noted that any suitable mask may be utilized in accordance with various embodiments, including, for example, a single color, such as black, white, or blue would work, snow (random black and white pixels), classic Society of Motion Picture and Television Engineers (SMPTE) color bars, a recognizable icon, etc.

Figure 7A:
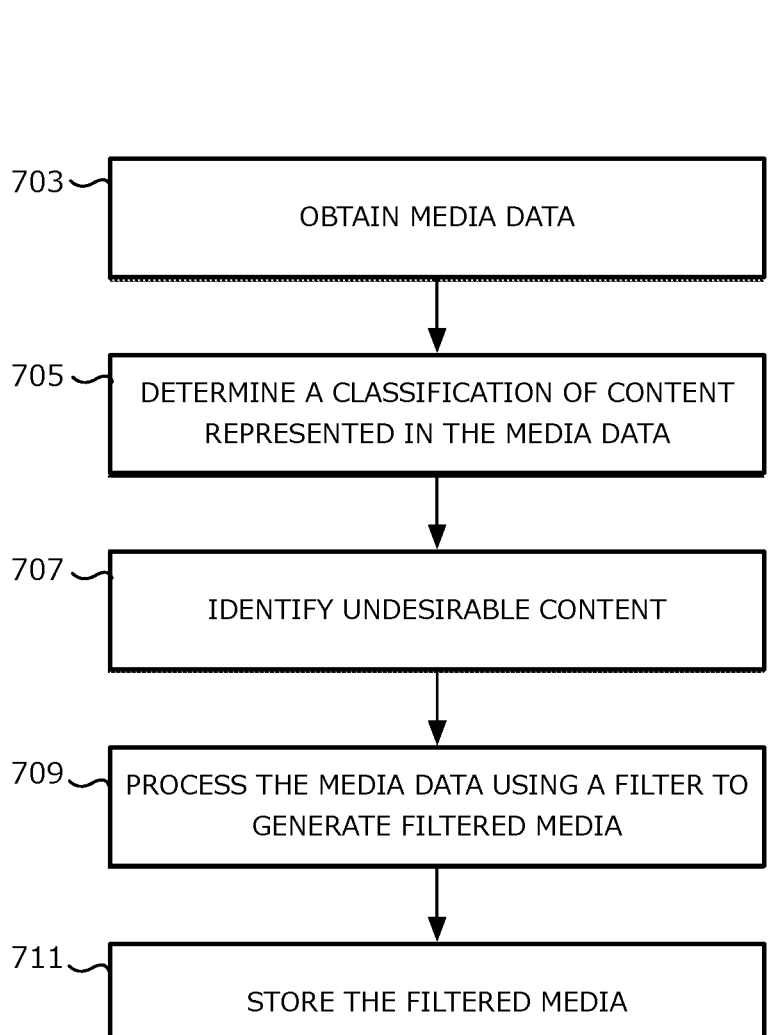
FIG. 7A illustrates an example process for content modification in accordance with various embodiments.

FIG. 7A illustrates an example process 701 for content modification in accordance with various embodiments. It should be understood that there can be additional, fewer, or alternative steps performed in similar or alternative orders, or in parallel, within the scope of the various embodiments unless otherwise stated. In this example, media data is obtained 703. In an example, the media can be obtained from a buffer, obtained from a continuous stream of media data, from a data store, etc. The media data can include audio data, video data, image data, etc., and includes live media, recorded media, or a combination thereof.

A classification of content represented in the media data can be determined 705, and based on the classification, undesirable content can be identified 707. For example, content identified in the media data and/or features representative of the content with defined data (such one or more words or combination of words) can be compared to stored features to identify an object, action, text, etc., represented in the content. The defined data can be associated with, e.g., offensive, inappropriate (e.g., curse words, offensive vocalizations, explicit visual material, etc.), and/or otherwise undesirable content. The identified content can be compared with the defined data or some portion of the defined data to attempt to find a match. In the situation the identified content matches defined data known to be associated with offensive, inappropriate, and/or undesirable content, the matched content can be classified accordingly. For example, the content can be classified as inappropriate. In a specific example, a keyframe from the media data can be determined using at least one video frame selection algorithm. The keyframe can be analyzed to identify features representative of the content represented in the keyframe. Predetermined features that match the features representative of the content can be determined and the classification of the content can be determined based on the predetermined features. In another example, classification models may be utilized (e.g., appropriately trained neural networks) to identify groups of frames or individual frames with undesirable content. In yet another example, approaches provide for utilizing an autoencoder to perform semantic analysis of frames or chunks of media, replace one or more undesirable content features if present, and regenerate the media from its encoding.

The classified media data can be processed 709 using a filter to generate filtered media, where the undesirable content represented in the filtered media is indiscernible to an observer. Thereafter, the filtered media can be stored 711 to an output buffer. In an example of filtering the classified media data, approaches provide for erasing segmented regions of undesirable content and perform inpainting using a neural network model to predict information that might exist within the erased region. In another example, approaches provide for utilizing an autoencoder to perform semantic analysis of frames or chunks of media, replace one or more undesirable content features if present, and regenerate the media from its encoding. In yet another example, portions of the video image from the original media may be preserved and the content that a viewer would recognize as undesirable can be rendered indiscernible.

Figure 7B:
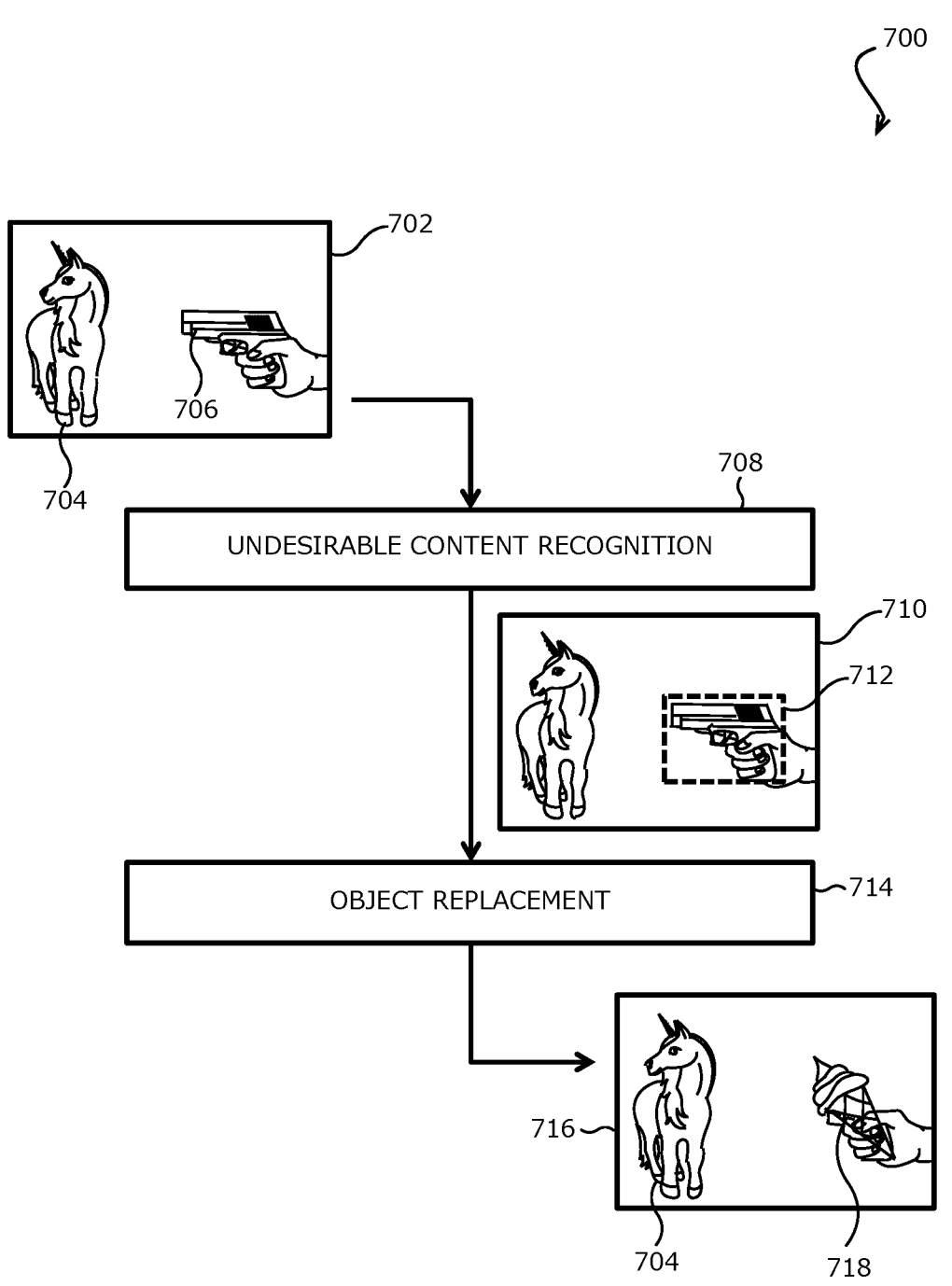
FIG. 7B illustrates an example process for replacement an object represented in video data in accordance with various embodiments.

For example, FIG. 7B illustrates example 700 of object replacement in a video context. In this example, video image 702 includes a representation unicorn 704, which is desirable content, and gun 706 in a hand, which is undesirable content. Video image 702 is evaluated by a trained model (e.g., a CNN) 708 to generate video frame 710 in which the gun is surrounded by bounding box 712. Bounding box 712 indicates the location and size of the undesirable content. Frame 710 is evaluated by object replacement component 714. Object replacement component 714 uses the information that the undesirable content is a gun to map to an ice cream cone as an appropriate replacement object. Image data for an ice cream cone is read from a replacement object database. The image is scaled to the size of the gun and overlaid at the location of the gun. The object replacement produces video frame 716 in which unicorn 704 is visible without change but an ice cream cone object 718 is overlaid at the location and with the size of undesirable content (e.g., gun 706).

In accordance with an embodiment, the trained model can include a generative filter. A generative filter, such as one built on a generative neural network, is one that produces media as output. A common approach to training generative neural networks is adversarial training, which produces generative adversarial networks (GAN). A generative filter can produce output that is discernibly the same as its input if no undesirable content is present but different from the input if undesirable content is present in such a way that the undesirable content is indiscernible.

As described, a content filter based on a neural network may recognize which data within media represent parts of undesirable content. Such a filter may then perform processing on just that data to degrade it and make the content indiscernible. One possible type of degrading is silhouetting. That is by replacing all data of the undesirable content, such as audio frame frequency components or video frame pixels, with a constant value. Another possible approach is blurring. This is essentially a process of removing high frequency information. In the context of video, that would appear as a blurred segment of the frame. In the context of audio, that would be blending together different neighboring frequency components within a frame. Note that it does not mean reducing high frequencies components within the frame any more than low frequency components.

Another possible type of degrading is pixelation. This is essentially blurring locally within segments but independently between the segments. In video images, this causes the undesirable content to appear to be made from large rectangles of pixels such that its specific details are indiscernible. In the context of audio, pixelation has the effect of strengthening some and weakening other sub-ranges of frequency components, which will give a general sense of the audio but without complete intelligibility. That means for speech audio it would be possible to tell that the audio has speech but not possible to tell what the speaker is saying. This is sometimes known as garbling the speech.

Figure 8:
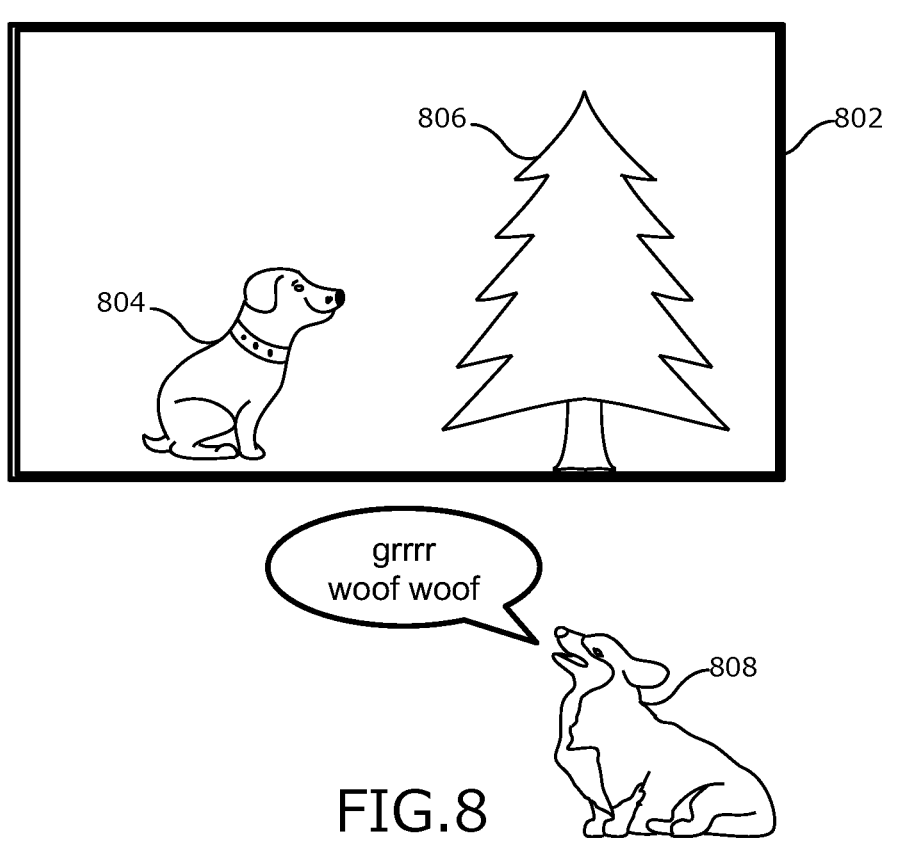
FIG. 8 illustrates an example approach for identifying content in accordance with an embodiment.
Figure 9:
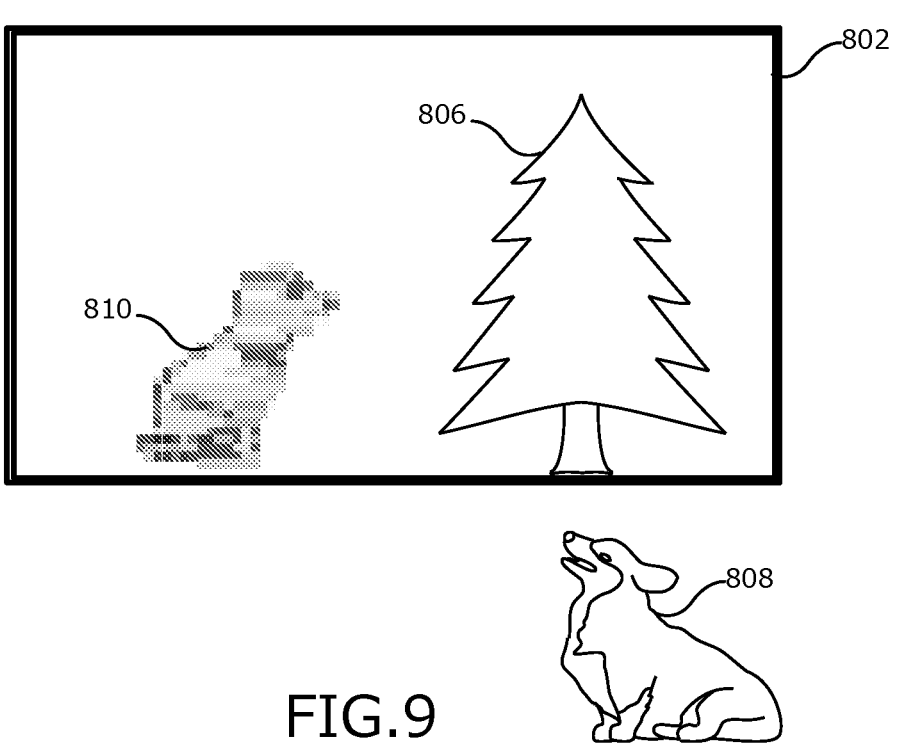
FIG. 9 illustrates an example approach for modifying content in accordance with various embodiments.

For example, dogs can recognize images of dogs in videos and sounds of dogs in audio. Often, real dogs become excited when encountering such images or sounds and sometimes bark loudly. The barking can disturb some people such as nervous people in adjacent apartments. Dogs might also be able to recognize trees in videos, but most dogs usually don't bark at trees. FIG. 8 illustrates the particular problem in the field of pet behavior control. A flat-screen television set 802 has content showing dog content 804 and tree content 806. A real dog 808, seeing the media with dog content 804, growls and barks. FIG. 9 illustrates a similar scenario with television set 802 but a generative filter processes the video media, segments data containing dog content, and pixelates the dog content 810. The filter does not change the tree content 806 since the tree is not undesirable content. As a result of the segmentation and degra- dation, the real dog 808 cannot recognize dog content in the media and so the real dog quietly observes the tree content 806 and indiscernible pixelated dog segment 810.

Another possible type of degrading is muffling. In audio, this is a process of decreasing the levels of frequency components of particular use for recognizing the content. For example, reducing the level of frequencies in the range of human voice can make speech difficult to understand. In the context of video, this would appear as a greying of the undesirable content within the video images, similar to silhouetting or blurring, but leaving information that gives the gist of the content even without it being fully intelligible.

Another approach that relies on generative filters and segmentation is erasure and inpainting of predicted data. This begins with segmentation. Segmentation may be per- formed simply as a large segment, such as a rectangle within a video image or fixed range within an audio frame. Seg- mentation may also specifically outline the data representing features of undesirable content within media.

After erasing data for the features of undesirable content, a generative neural network predicts, for each erased pixel, what it should be in an image using a model trained without undesirable content. Erasure does not necessarily require overwriting stored data such as with a zero value. It simply requires identifying data to be replaced.

Figure 10:
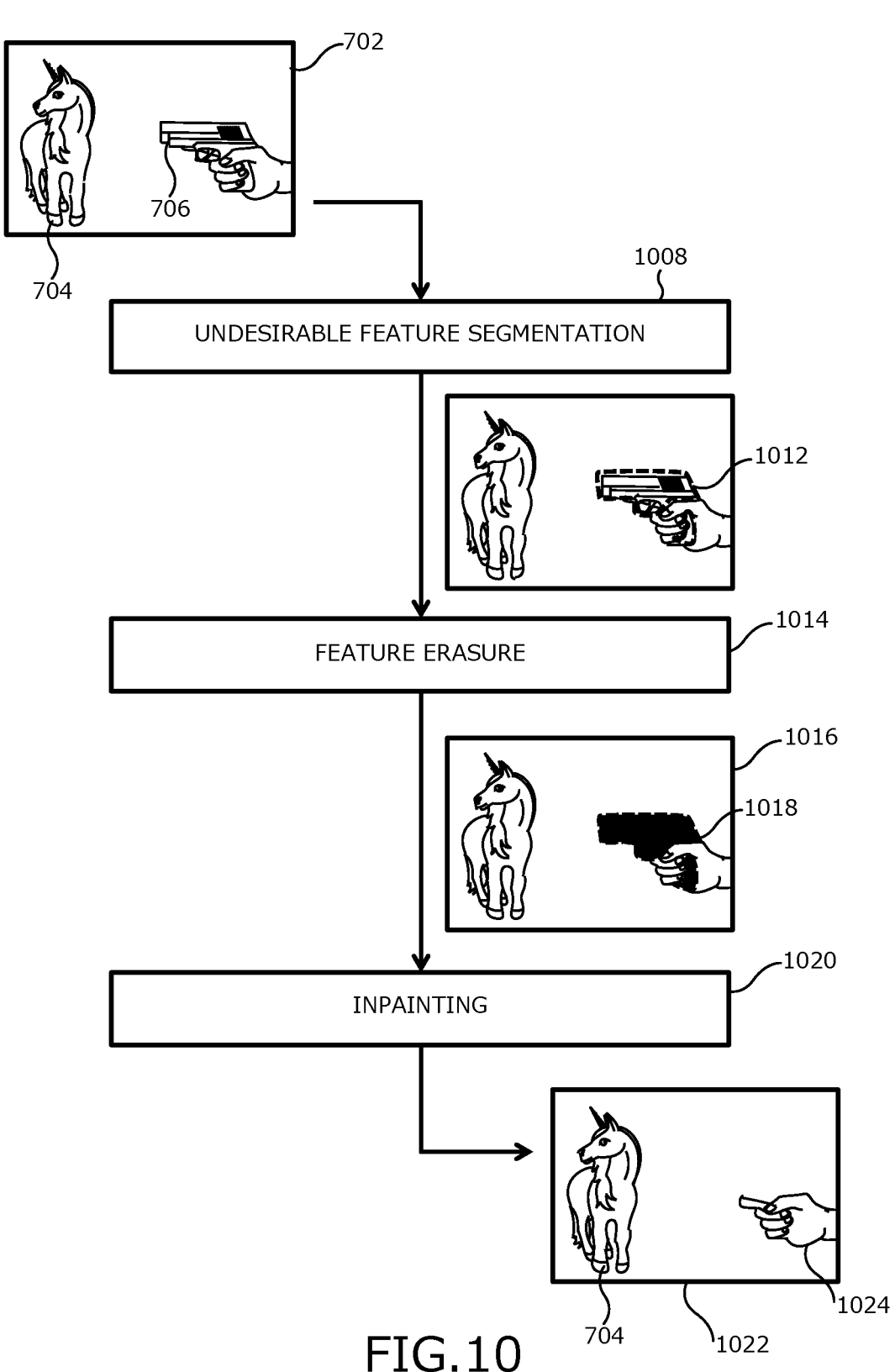
FIG. 10 illustrates an example process for video content erasure in accordance with various embodiments.

FIG. 10 illustrates an example of inpainting applied to the input video of FIG. 7. Within video frame 702, the desirable content of a unicorn 704 and undesirable content of a gun in hand 706 is discernible. The content filter performs a step of segmentation 1008 of the undesirable feature. A represen- tation of the segmented video frame shows boundaries 1012 of the regions of undesirable content. The content filter performs a step of erasure 1014. A representation of the video frame with the undesirable content erased 1016 shows the segmented boundary with the pixels of the erased undesirable content shown in black 1018. Next, the filter performs a step of inpainting 1020. This is possible using various image inpainting techniques. The resulting video frame 1022 illustrates the desirable unicorn content 704 unchanged but the undesirable gun in hand content 706 replaced by a pointing finger 1024.

Such inpainting works well when the generative neural network that produces the pixels within the erased region is trained on a sufficient number of sample videos that contain similar content, such as hands, but no undesirable content, such as hands with guns. If the training content includes hands with pointing fingers, the inpainting neural network might find that a pointing finger most closely matches with the parts of the hand that are not erased. Therefore, it will predict fill pixel values that produce resulting media that looks like a pointing finger within the region from which the gun was erased.

Figure 11:
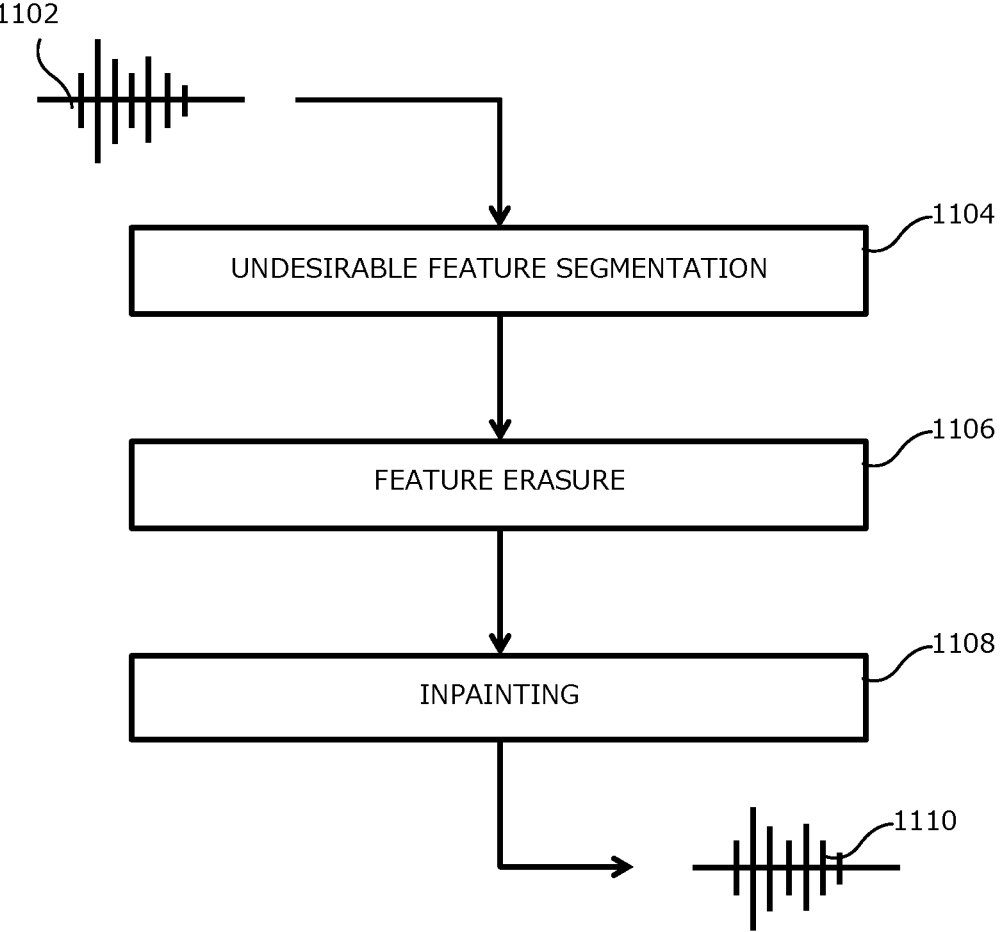
FIG. 11 illustrates an example process for audio object replacement and inpainting in accordance to various embodiments.

In the context of audio, segmentation, erasure, and inpainting are possible with methods analogous to those described above. FIG. 11 illustrates an example in accor- dance with various embodiments. Audio signal 1102 is processed by a step of segmenting undesirable features 1104. Recognizing undesirable audio content typically requires recognizing features across multiple frames. That is true for video images, but especially for audio. As a result, a neural network for audio segmentation should be some sort of RNN. Segmentation will generally happen on frames of audio represented in the frequency domain. This is typically produced by performing a fast Fourier transform (FFT) or similar function on an array of time-sequential samples of varying air pressure waves. Such filters perform segmenta- tion on frequency component values within frames and typically propagate from one frame to the next with small changes in which frequencies are included in the segmen- tation.

Techniques for segmentation of audio vary by the type of content to be filtered. A gunshot, for example, is short with a lot of energy across all frequencies. Because it is short, there is not a lot of temporal information to strengthen a recognition probability. Since it sounds similar to a twig snapping, a book falling, or a person saying the letter K, segmentation for gunshots can be made more accurate if the filter receives an input from a model that performs image classification on the corresponding video. Similarly, recent audio features, such as recognized speech that includes words that come before gunshots, can also provide useful inputs for segmenting gunshots within audio.

In contrast, words tend to span many frames of audio. Recognizing and segmenting words to, for example, remove undesirable profanity content, is relatively easy by gathering significant temporal information. The disadvantage is that to collect enough temporal information to go back in time to perform inpainting to make profanity indiscernible requires delaying the output of audio by enough time to recognize words. This can be improved with accurate phonetic acous- tic models and accurate statistical language models.

In FIG. 11, the segmented audio has its distinguishing frequency components in relevant frames erased in step 1106. Next, the filter performs a step of inpainting of the erased features 1108 to generate resulting output audio 1110 with the undesirable content rendered indiscernible. For the purpose of, for example, erasing undesirable speech, the segmentation can segment enough information to render the undesirable speech indiscernible. An inpainting neural net- work trained on speech that includes no undesirable words, if a sufficient amount of audio information is not segmented, can generate speech audio with the nearest similar-sounding words in the training data.

Another approach to removal of undesirable content is to use an autoencoder neural network. This would typically be implemented with a deep network including one or more CNN layers on the input. A filter based on an autoencoder approach can be trained on audio or video labeled with undesirable content. Labeling can specifically highlight the undesirable content within the labeled media. This would allow training to learn a convolutional filter that works well to recognize undesirable content. However, simply labeling short segments of media as having undesirable content or not without specifically segmenting the content can provide information for a neural network to learn what content is undesirable by learning similarities between media labeled as containing undesirable content.

After training to recognize undesirable content within media, an appropriately trained autoencoder encodes media in a way that a feature vector includes a parameter that represents the undesirable content. By encoding the media, then decoding it with the feature value for undesirable content set to zero, the generated filtered media will not have the undesirable content. In certain embodiments, there is a feature value that represents the one or more types of undesirable content. Advantageously, this can reduce loss of information between encoding and decoding, allowing for the encoded media to be approximately as wide as the input and decoded media. Such an autoencoder approach can work well for video and audio data. It will typically include some CNN layers and may also have some recurrent layers. Including temporal information in the encoding can allow for more accurate decoding with a smaller encoded feature vector size. This can help to reduce the training time needed to achieve a desired accuracy.

Figure 12:
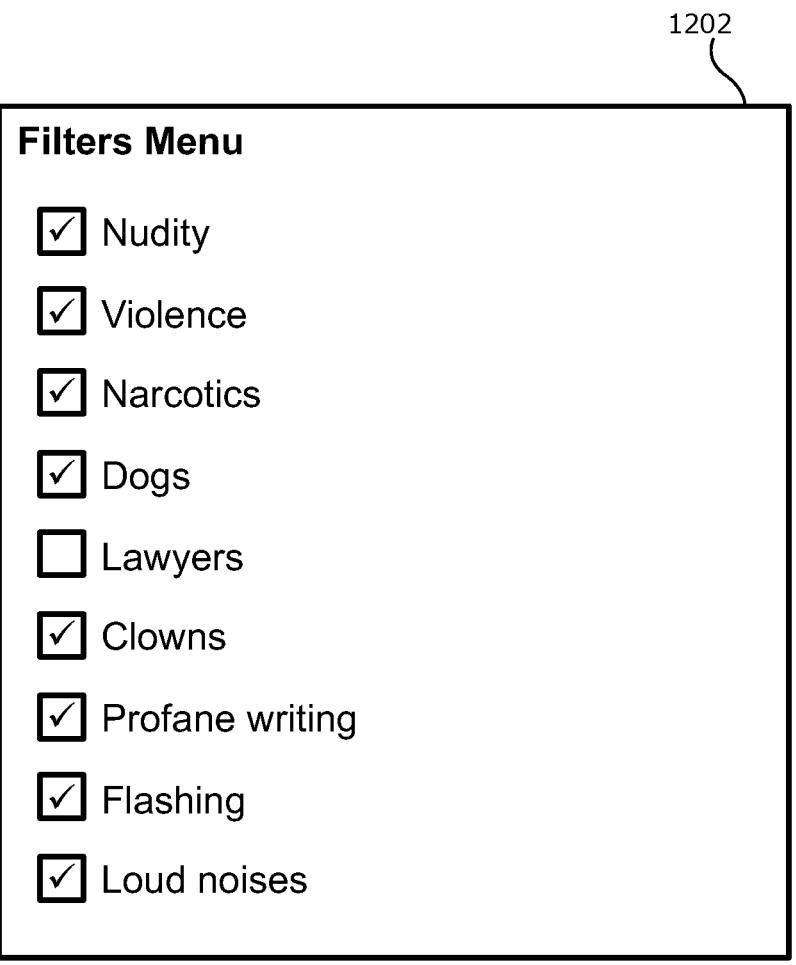
FIG. 12 illustrates an example menu of optional content filters according to an embodiment.

Different users of media playing devices have different preferences for filtering. Some might want to filter nudity content. Some might want to filter violent content. Some might want to filter neither or both. Some might particularly want to filter dog content. Several approaches are possible for providing multiple independently configurable filters. FIG. 12 illustrates menu 1202 available within a television set such as television set 802 from FIG. 8 and FIG. 9. In an embodiment, the menu can be controlled by an infra-red remote controller using an Up/Down and Enter button. Up and down move a highlighting between items on a list of types of content that can be filtered. Enter toggles whether the filter will be enabled or disabled. In this example, menu 1202 lists nine types of content: Nudity, Violence, Narcotics, Dogs, Lawyers, Clowns, Profane writing, Flashing, and Loud noises. FIG. 12 illustrates all filters selected except for lawyers. These would be typical selections for a user who enjoys watching television shows about the intriguing lives that lawyers lead.

It is desirable in some implementations to enable a neural network implementation of a filter to condition its outputs on an input parameter that is determined from a user setting. One possible approach is to train a neural network to recognize multiple types of undesirable content. A CNN-based classifier neural network with multiple outputs is possible. The neural network is trained to compute, for each output, a probability of one type of undesirable content. The device user setting of what types of content to filter can be applied as a mask to the outputs, effectively forcing to zero the probabilities of types of content not to be filtered. For any type of content to filter, if the unmasked probability exceeds a threshold, filtering can follow. The device may then apply one or more filters trained for the type of content to be filtered. The filtering may use any of the approaches described above such as frame replacement, replacement objects, segmentation with degradation, segmentation with inpainting, combinations, or other reasonable approaches to making the undesirable content indiscernible.

One approach to filtering is to train a single or small number of complementary neural networks such as a CNN, classifier, DNN, and generative neural network that operate as a single unit to filter all types of content that the device is designed to handle. Having a single neural network configuration for all types of content with input parameters for conditional processing uses the minimal amount of processing requirements within the device, thereby minimizing the cost for compute capability and the power consumption in the device. However, it requires a relatively lot of training processing for each improvement and update.

Many possible implementations of content filtering in media playing devices use neural networks. Any given neural network may have one or more layers. DNNs may have several layers and some CNNs for high-resolution media have many layers. Simple classifiers may require one or only a small number of layers, which might operate on input feature vectors that are the outputs of an upstream neural network such as a CNN. It is also possible to combine layers of different types of neural networks within one neural network. For example, it is common to include a layer with recurrence between convolutional layers and a downstream classifier. It is even possible to include recurrence within CNN layers, which can help use temporal information in recognizing features. Some content is easier to recognize when moving or changing than statically within a frame. This is very important for speech recognition across frames, but also relevant to video processing where, for example, a striped dog in tall grass is difficult to recognize until it is moving or the difference between a scientific and pornographic depiction of a nude body may be recognizable only by its motion.

Furthermore, rendering undesirable content indiscernible, may use generative neural networks, which may be implemented downstream from a neural network used to recognize undesirable content. They may have intervening logic. Alternatively, a neural network for recognition and a generative neural network for rendering undesirable content indiscernible may be implemented as a single neural network deeper than cither alone.

Some consumer media playing devices may be designed to support multiple independent filters, each trained for a specific type of content. Device makers or their ecosystem partners may offer filters in a manner such as an app store that can provide very large numbers of custom content filters. Some may be free, but others may be sold. Third-party developers with large corpora of training data may monetize it by using it to train specialized filters and then selling those through a filter store. For example, a filter provider may use example images of Roman numerals in different contexts to train a filter that automatically replaces Roman numerals with corresponding Arabic numerals in video. For another example, a company with a lot of voice recordings of the word "Alexa" may offer an audio filter that replaces the word "Alexa" with the phrase "Okay Hound" in audio media. For another example, a filter provider may offer a filter that replaces images and sounds of dogs with images of trees and sounds of rustling leaves.

Based on the processing capabilities of the media playing device, it may be designed with a maximum limit of filters that it supports. If filters are implemented with a standard neural network architecture, devices can be designed with very specific maximum limits on the number of filters. If the filter ecosystem allows greater flexibility for filter 3rd party providers to make trade-offs between accuracy and processing requirements, then device makers must design more conservative limits on the maximum number of filters it allows users to include simultaneously. Filters may be implemented as dynamic-link libraries (DLL) under the control of the operating system for the media playing device.

For the filters that a user selects, the media playing device applies the filters to media content at an appropriate point within the processing pipeline before it is presented through speakers or a video display. If filters may be implemented that affect all data within a frame (pixels or audio frequency components), noise can accumulate through a series of multiple filters. If filters perform segmentation and only render undesirable content indiscernible within segmented regions, noise will not accumulate within unfiltered regions. In a system that can allow the introduction of noise within unfiltered regions, it would be desirable to design a relatively low limit on the number of filters to prevent significant signal degradation that could cause consumers to be dissatisfied with the media playing device.

Another benefit of modular filters is that they can be independently replaced or upgraded without training a new unitary filter. As with apps for handsets and tablets, filter providers may provide upgrades as they procure more data or improve training algorithms to provide more accurate and precise filters. Such upgrades can occur without requiring any user intervention if devices and the infrastructure for providing filters are designed to provide that.

One possible approach for modular filters is to define them as containerized software. This can allow filter providers great flexibility for choosing a neural network architecture that provides appropriate trade-offs between performance and accuracy for the specific type of content that they filter. This can include different numbers and organization of layers, nodes per layer, recurrent paths, convolution filters, etc. Providing filters as containerized software also allows for other software-programmed customizations beyond just neural filtering features. This can include DSP algorithms or even further user-specific customizations.

Another possible approach to modular filters is to define one or a small number of specific neural network architectures. With this approach, a filter is just a fixed-size set of the constant values of weights and biases for the filter. This is similar to how federated learning packages and passes around parameters or gradients for jointly trained models. Fixing the architecture ensures that a consumer device can process a filter model without having to be overdesigned. This is especially helpful if the model architecture is fixed in dedicated, non-programmable hardware.

On programmable processors, Eigen is a commonly used tool to parallelize computation. By default, Eigen parallelizes the computation across rows (for matrix multiplication). With an 8 core CPU, if computations are all matrix multiplies, then a reduction of 8× in processing time is possible per filter. With N filters, even if the filter models are small, it can be expensive to context switch between filters. This expense is less in an approach that uses a unitary model rather than modular filters for different content types.

It is also possible to define modes that enable groups of filters together, such as a dog mode that would filter out dog bark sounds, images of dogs, and video violence. Having modes, rather than independently selected modular filters, can provide a simpler user interface for device users who are less technically inclined.

On-Device Storage

Media playing devices typically have general-purpose programmable applications processors that run software stored in non-volatile memory such as Flash RAM chips. Such chips can also store data that includes static information like a device model and serial number. It can also store user setting information such as an account name and password. It can also store user setting information such as the contrast and brightness user settings, a selection of input source such as between High Definition Media Interface (HDMI) port. Furthermore, on-device storage can store the information about which of available filters are enabled, the neural network parameter values for media filters, the containerized software for media filters, overlay replacement objects for replacing undesirable content, and other information about which of various methods to use for rendering undesirable content indiscernible.

Some devices allow for the on-device storage to be updated, including the information about filters. Such updates can be part of firmware updates provided by the device vendor. They can be part of routine updates from an ecosystem filter provider such as a filter store. They can be updated from portable media that a user plugs into the device. By updating the on-device storage, improvements to the performance or capabilities of filtering within media playing devices are possible. The process of updated stored parameters is performed by overwriting the stored parameters within a storage device such as a non-volatile memory chip.

Media Embedding

It is also possible for filter parameters or containerized software to come to the device embedded within files or streams of media information. Many standards organizations such as the Motion Picture Experts Group (MPEG) and the International Standards Organization (ISO) and large companies exist that create de facto standards for media transport such as MPEG transport stream format, Third Generation Partnership Project (3GPP), Microsoft Audio Video Interleave (AVI), Apple QuickTime, and Waveform Audio File format (WAV), among many others.

Figure 13A:
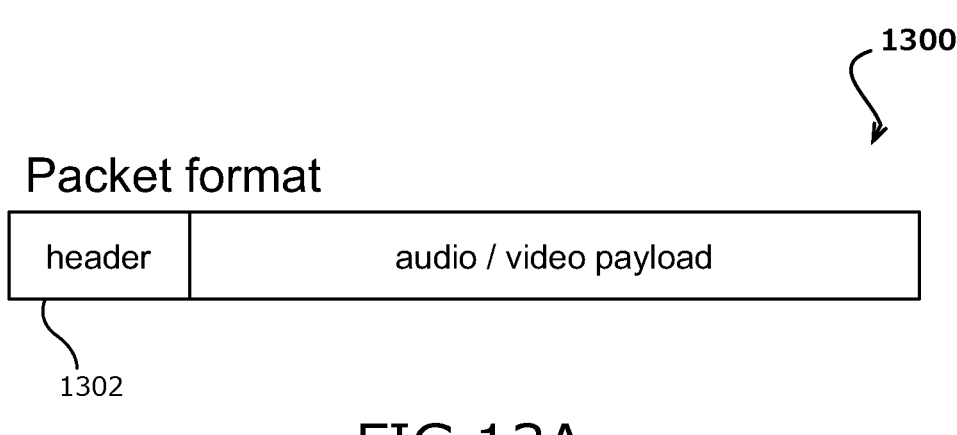
FIG. 13A illustrates an example video packet format in accordance with an embodiment.
Figure 13B:
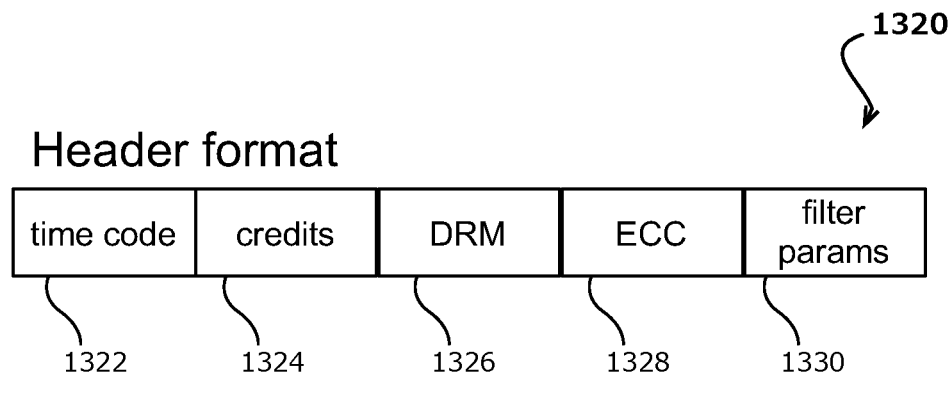
FIG. 13B illustrates an example video packet header format in accordance with an embodiment.

Common to all such transport streams and file formats is that they have header information followed by a payload of audio and video data. FIG. 13A illustrates an example of information organization within packets of a packetized media transport protocol 1300. The header 1302 carries information relevant to how the media payload should be processed. FIG. 13B illustrates an example of some kinds of information that would exist within a transport protocol header format 1320. The header includes a time code 1322 for synchronization of playback and detecting dropped packets, credits 1324 about the media such as the title, creator, and copyright owner, digital rights management (DRM) 1326 information that can prevent playing of the media on devices that do not have appropriate permissions, some error correcting code (ECC) 1328 information, and filter parameters 1330. The filter parameters 1330 may be simple sets of neural network parameters such as weights and biases, might include containerized executable software, and might include the definition of the selection of other DSP functions to be performed on the payload media. Some formats may provide filter parameters only at the beginning of a program or file. Some formats may encode the filter parameters with each or a subset of all packets to support observers joining in the middle of a program. Some systems may provide the filter parameters at the start of a user requesting to play the media, regardless of what point in the media stream or file the user chooses to start.

While it is possible for providers of movies or television shows to create two or more versions of the show with content appropriate for different audiences, they can only create several versions and have to make judgment calls at the studio level as to what type of content appears in each version. This gives users little control. For user-generated content providers, such as YouTube, it would be essentially impractical to store and stream and cache in local networking hubs many copies of each type of media.

By providing information for a relatively large number of filters within the media stream, it allows users fine control over what content is and is not discernible within the media. It allows this with a single copy of stored, cached, and streamed media. It also allows the media creator to control what filters are available, as appropriate for their artistic choices. Allow any user-selected filter from a filter store would have the disadvantage of users being able to create content filters that would change the meaning of stories. For example, a user-chosen filter that replaces swastika images with peace signs or replaces gunshots with trombone wah-wah sounds would make a documentary about World War II confusing to observers.

Real-Time Filtering

Another advantage of content filtering in media playing devices is that it can operate on real-time live content.

Furthermore, whereas live events such as sports and presidential debates are played with a short delay with editing staff monitoring the feed for undesirable content, that is not possible for user-generated or user-to-user content such as Live video broadcasts on Facebook our YouTube or video chats using services such as Apple FaceTime, Microsoft Teams, Google Hangouts, or Zoom video chats or corporate conference calling services.

By performing content filtering in the media playing device such as a television set, a Polycom-type conference call phone, a mobile handset or tablet, or even an automotive entertainment system, it is possible to filter live content in real-time. That is especially true if the filtering is performed near the end of the media processing pipeline, such as in the audio output or video output frame buffer. Doing so, it is possible to overlay a gun video content with an ice cream cone as in FIG. 7, as soon as enough of the gun is visible to recognize the content as a gun. Similarly, it is possible to turn the word "fuck" into "fun" with less added latency than the time needed to output the phoneme K.

Since filtering audio or sequences of video images requires observing multiple frames of information, it is necessary to delay the output somewhat to perform the analysis. Such devices can have a mode to enable and disable one or more types of filtering. With filtering disabled, there is no delay.

The delay, however, can provide the context a filter needs for each forward pass over input data. For audio, tens of milliseconds should suffice for many devices. For processing single images, no delay is needed. For processing video with a filter that uses temporal information between frames, multiple frames are needed. Eight frames are enough for most filters. A frame rate of 30 fps would, therefore, require about 0.25 sec of delay.

One approach is to run the filter on buffered frames of video. However, there is a lot of redundant information in many frames of buffered video. It is possible to save frame buffer storage space and bandwidth by training a filter to run on the coded predicted (P or B) frames of video. Storing the coded prediction information (and, optionally, also the residuals) of many prior video frames is much less expensive than storing and operating on decoded frames for display.

In the context of a device that captures video or audio media and transmits it, it is possible to perform content filtering in the device before transmission. Accordingly, for example, a parent may configure a device such that a child cannot use it to show or say undesirable content to others. In such a configuration, the filtering is performed on the raw captured media near the beginning of the media processing pipeline before encoding and transmission.

Figure 14:
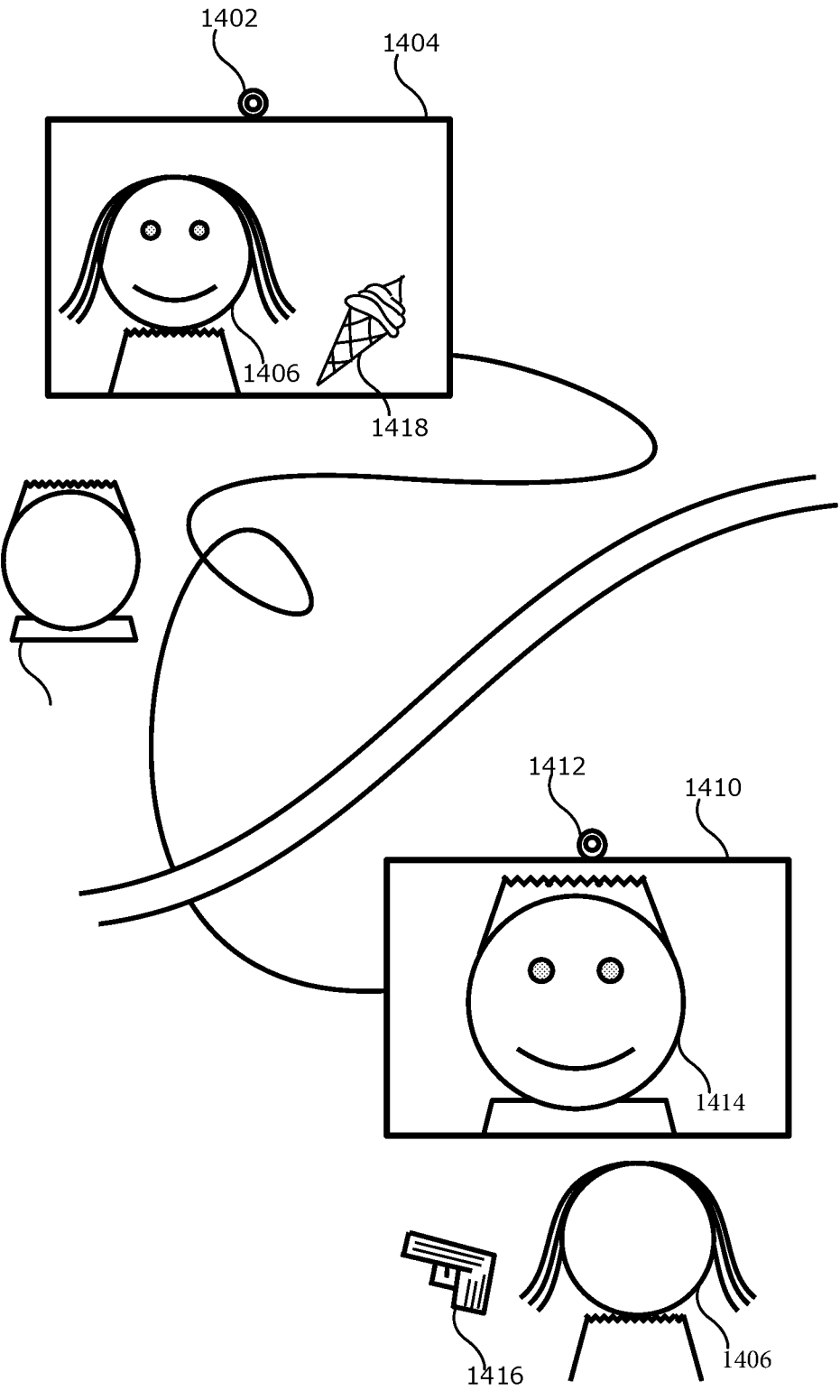
FIG. 14 illustrates an example video conferencing arrangement with object replacement in accordance with an embodiment.

FIG. 14 shows an example 2-way video chatting system in operation. A video display device 1404 outputs video while a capture device 1402 captures video. The video conferencing system sends the captured video from capture device 1402 to video display device 1410. Meanwhile, a capture device 1412 captures video and sends it over the network to provide the media output for video display 1404. Capture device 1412 captures video of a user Alice 1406. She appears on the video display 1404. Capture device 1402 captures video of Bob 1414. He appears on video display 1410.

When Alice 1406 pulls out a gun 1416, media filtering either in capture device 1412 or video display device 1404 recognizes the gun 1416 as undesirable content. It estimates the location and size, in pixels, of the gun within the video image. It then proceeds to replace the gun with an ice cream cone object 1418 as described above with regard to FIG. 7.

This is one example for illustration. It would also be possible to use a filter that does frame replacement so that the video appears to turn off for Bob when Alice pulls out the gun. It would also be possible for a filter to blur or pixelate the image of the gun. It would also be possible for the filter to erase the gun and inpaint pixels in its place such that the image would appear to show a hand without a gun. Other filtering techniques as discussed above are possible.

Furthermore, the techniques described with respect to video in the example shown in FIG. 14 have equivalents in audio. For example, a sound of a gunshot may be muted, replaced by the sound of a horn, distorted, or made to sound like background sounds in the audio in surrounding context before and after the gunshot. Similar approaches are possible for undesirable spoken words that can be muted, bleeped, distorted, replaced by an alternative word that either sounds similar, has a high statistical probability of occurrence within context according to a language model, or both.

Media Playing Devices

Figure 15:
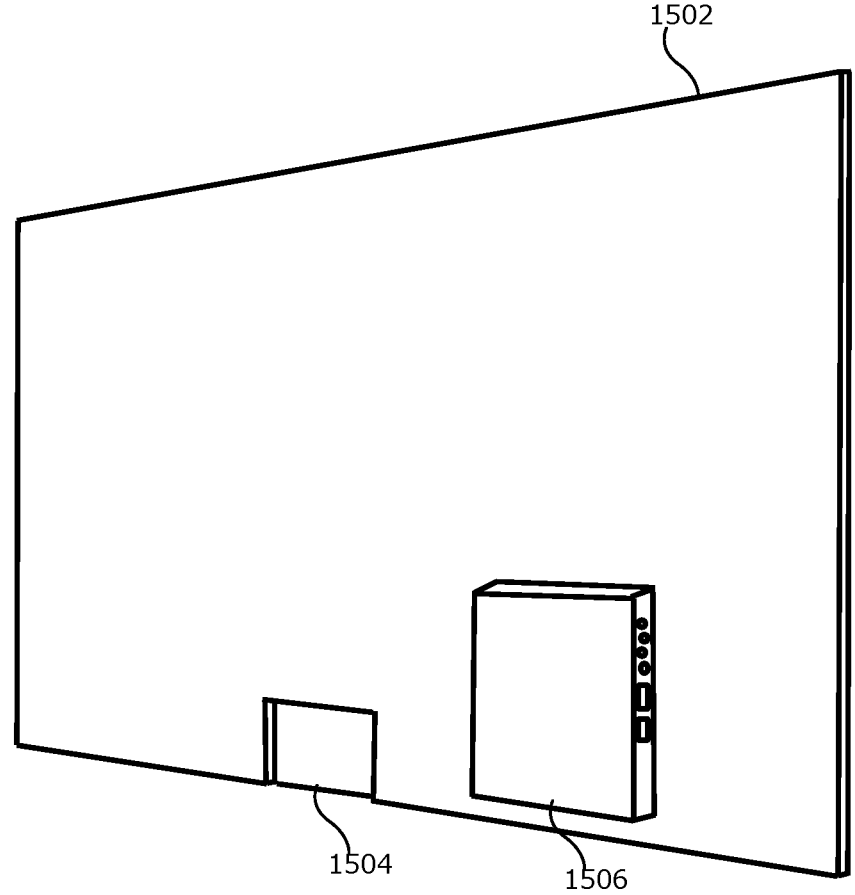
FIG. 15 illustrates component of a computing device that supports various embodiments.

Content filtering can be applied to a wide range of media playing devices. FIG. 15 shows an example of a television set 1502. This rear view mostly comprises a large flat panel display. It further comprises a mounting mechanism 1504 for attachment to a stand or wall hanging bracket. The television set 1502 also has an I/O controller box 1506 attached to the back. The box comprises connectors for interfaces such as HDMI video and audio output jacks. It also contains the media processor chip or combination of multiple appropriate chips that will be described in more detail below.

Television sets, because of being a size close to the size of people and dogs, are a frequent source of agitation for dogs. However, media filtering is not just applicable to large stationary displays such as television sets. Even small-screen devices such as mobile handsets and tablets, when presenting sounds and images, can stimulate dogs or present other kinds of undesirable content.

Figure 16:
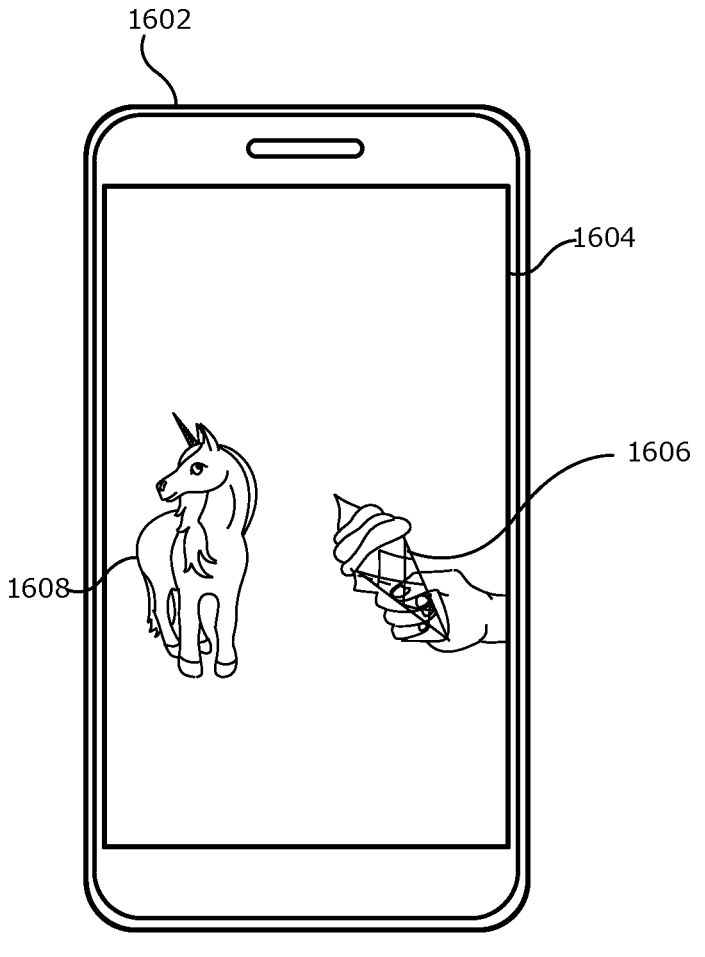
FIG. 16 illustrates a computing device in accordance with various embodiments.

FIG. 16 illustrates an example of a smartphone 1602 performing content filtering. It comprises a display screen 1604 that shows a streaming video. The streaming video contains a unicorn, 1608, which is desirable content and a gun, which is undesirable content. A chip inside the smartphone performs media filtering on the video, recognizes the location and size of the gun within the video media. The chip then reads a replacement object from memory, scales it according to the size of the gun, composites its pixels at the location of the gun content to cover the gun and make it indiscernible. Then the smartphone 1602 outputs the filtered video media on screen 1604 where not a gun but an ice cream cone 1606 is discernible.

Content filtering is useful in applications beyond consumer products. For example, in office environments, it may be desirable for conference calling systems or video conferencing systems to filter content that would create a harassing or hostile work environment. In another example, the video display systems for remote operators of drone aircraft need to look at video images to decide where to steer the airplane and when to drop objects from the airplanes. Such decisions are life-critical. Sometimes content in the video media can be distracting or even confusing. Trained neural networks for content filtering can process the images in real-time and perform object replacement to either indicate target places for dropping objects, places not to drop objects, or simply to remove distracting information from the video. In another example, an amplified sound system for an auditorium or concert hall can have a filter trained to recognize audio features that indicate feedback. The sound system can then perform frame replacement whenever feedback is detected with a less annoying sound that would indicate that a user that their microphone is too close to their speaker.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 17:
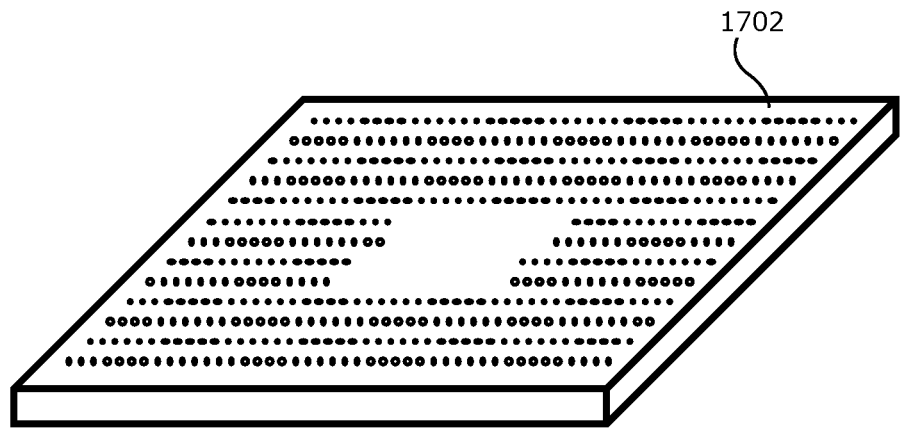
FIG. 17 illustrates a computing component in accordance with various embodiments.

Referring now to FIG. 17, modern media playing devices are controlled by system-on-chip (SoC) semiconductor devices (chips) such as the Qualcomm SnapDragon series, Apple-designed processors, Samsung-designed processors, among many others. They may also include peripheral semiconductor devices that perform special functions such as dedicated media processing chips, programmed field programmable gate arrays (FPGA), application specific integrated circuits (ASIC), specialized neural network processing chips, and chips that control physical interfaces such as display controllers, digital to analog converters, and voltage regulators. FIG. 17 illustrates the bottom side of a packaged system-on-chip device 1702 with a ball grid array for surface-mount soldering to a printed circuit board. Various package shapes and sizes are possible for various chip implementations.

Figure 18:
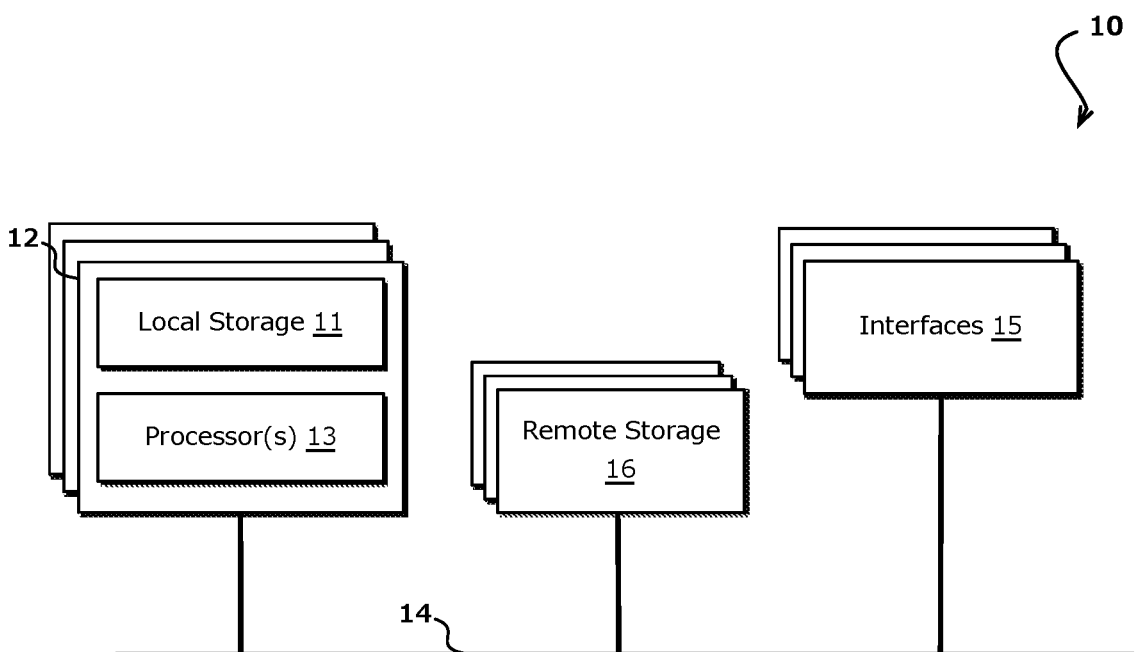
FIG. 18 illustrates additional components of a computing device in accordance with various embodiments.

Referring now to FIG. 18, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local storage 11 and/or remote storage 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local storage 11 (such as non-volatile random-access memory (RAM) and/or read-only memory (ROM), including for example one or more levels of cached memory) may also form part of CPU 12. However, there are many different ways in which memory may be coupled to system 10. Local storage 11 may be used for a variety of purposes such as, for example, caching and/or storing data, programming instructions, and the like.

Chips

It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices. In an example, a chip for media filtering reads original media from an input buffer and writes filtered media to an output buffer. The buffers may be implemented within the chip such as with on-chip static RAM (SRAM) or in external memory, such as in DRAM chips. On-chip memory, such as SRAM is generally much faster, but because manufacturing processes for logic chips do not allow as much memory density as for specialized DRAM manufacturing processes, on-chip buffers generally only accommodate relatively small data chunks. These may be more appropriate for audio processing or video processing at reduced resolution.

Special Processors

Content filtering in media playing devices may be implemented with a combination of chips or a combination of processors within the device. One of those chips may be a specialized processor for media filtering, a general AI accelerator such as a Nvidia Volta, Intel Nervana, Perceive Ergo, or Google tensor processing unit (TPU) chip, or an FPGA. Alternatively, content filtering in media playing devices may be implemented fully within a single chip. In any case, it can be performed with better performance per cost and per milliwatt using specialized processors. Such specialized processors may be designed as cores and offered for license by semiconductor IP companies such as ARM or other companies that design parts of chips in hardware description languages (HDL) but do not make or sell chips themselves. Optimized configurations of Cadence Xtensa and Synopsys ARC processors are other examples.

Some dedicated filtering chips or cores operate on data written into a shared RAM by a multimedia decoder. The filtering chip reads the decoded content and writes a new filtered copy of the content. This is comparable to dedicated demodulators, DRM, and decoder chips and cores in the media streaming technology space and vision and natural language processing (NLP) chips and cores in the machine learning space.

Content filtering may even be performed within a video display controller chip or core as the last step before driving pixels to a display. This would make the filtering effective for absolutely all apps, operating systems, and data sources.

Software

Many implementations of content filtering in media playing devices work by running software on programmable processors. The software is typically stored either as binary executables or interpreted code or a combination. The software that the processor executes to perform the method and system functions of content filtering is typically stored in non-transitory computer readable media such as punch cards, rotating magnetic disks, or non-volatile semiconductor random access memory (RAM) devices such as Flash chips.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), RS-232 Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FD-DIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 18 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote storage 16 and local storage 11) configured to store data, program instructions for the general-purpose network operations, or other information relating to the functionality of the embodiments described herein (or any combinations of the above). Program instructions may control execution of or comprise an operating system and/or one or more applications, for example. Remote storage 16 or local storage 11 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, magnetic tape, and punch cards; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memory storage, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 19:
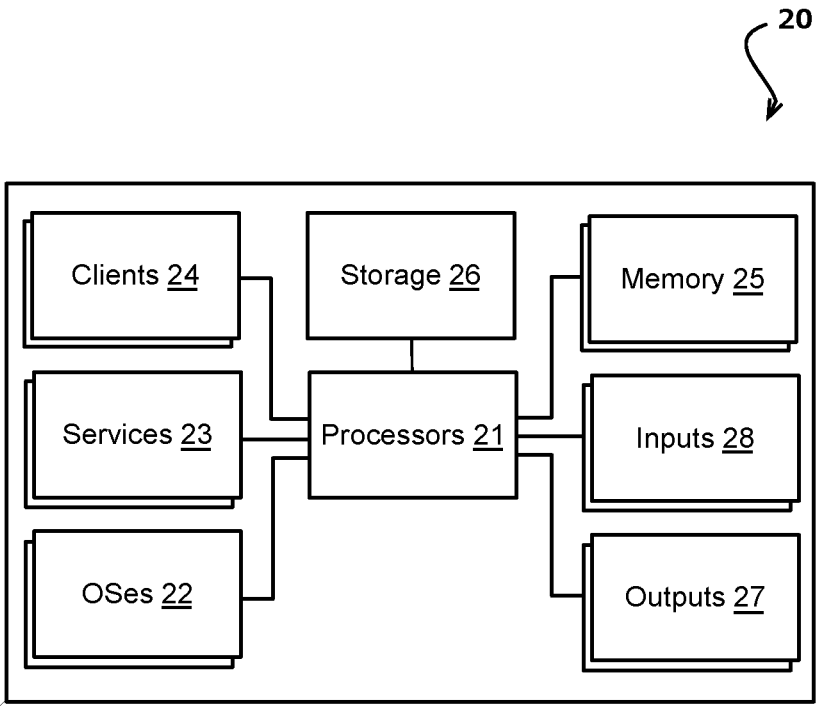
FIG. 19 illustrates an exemplary architecture of a system in accordance with various embodiments.

In some embodiments, systems may be implemented on a standalone computing system. Referring now to FIG. 19, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse 50, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memory storage, or electrical storage device for storage of data in digital form (such as those described above, referring to FIG. 18). Examples of storage devices 26 include flash memory, magnetic hard drive, CD-ROM, and/or the like.

Figure 20:
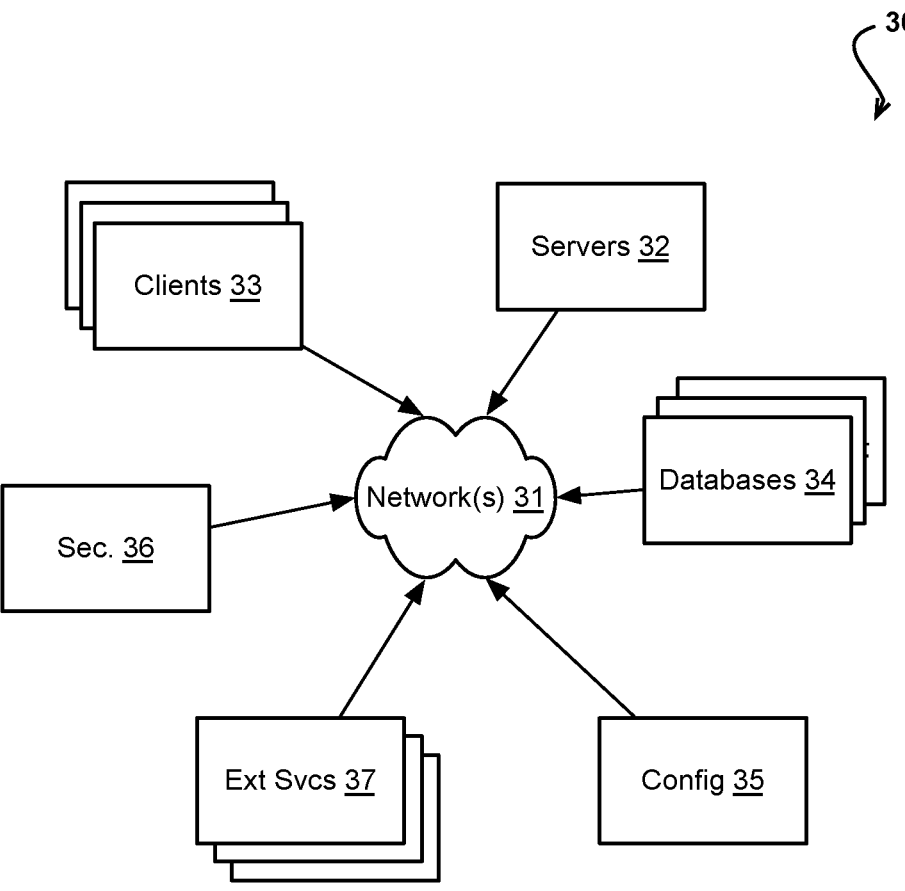
FIG. 20 illustrates another exemplary architecture of a system that supports various embodiments.

In some embodiments, systems may be implemented on a distributed computing network, such as one having any number of clients and/or servers. Referring now to FIG. 20, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 19. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security system 36 or configuration system 35 or approach is specifically required by the description of any specific aspect.

Figure 21:
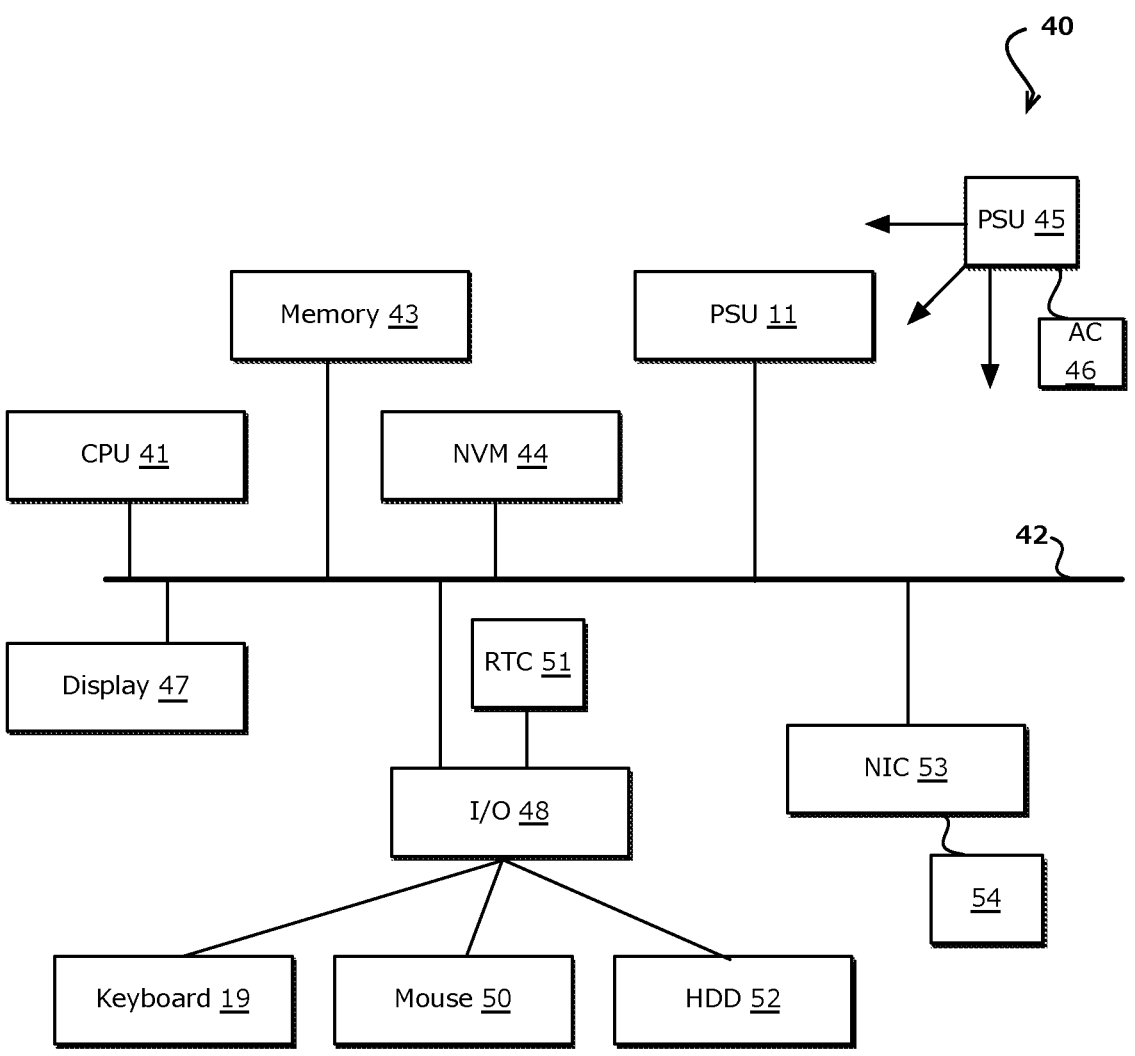
FIG. 21 illustrates components of a computer system in accordance with various embodiments.

FIG. 21 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 19, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the word "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

The invention claimed is:

1. A computing system, comprising:
an input buffer;
an output buffer;
a computing device processor; and
a memory device including instructions that, when executed by the computing device processor, enables the computing system to:
obtain media data from the input buffer,
use a neural network filter to identify undesirable content represented in the media data, wherein the neural network performs an autoencoding to generate a feature vector, sets a value of a feature that represents undesirable content to zero, and performs a decoding of the feature vector,
process the media data using the neural network filter to generate filtered media without the undesirable content, wherein the neural network filter performs autoencoding and autodecoding to generate the filtered media, and
store the filtered media to the output buffer.

2. The computing system of claim 1, wherein the media data includes video data, and wherein the instructions, when executed by the computing device processor to determine the classification of the content represented in the media data, further enables the computing system to:
determine a keyframe from the video data using at least one video frame selection algorithm;
analyze the keyframe to identify features representative of the content represented in the keyframe;
determine predetermined features that match the features representative of the content; and
determine the classification of the content based on the predetermined features.

3. The computing system of claim 1, wherein the neural network filter has at least one convolutional layer and at least one temporally recurrent layer.

4. The computing system of claim 3, wherein the neural network filter segments at least one region containing the undesirable content and performs degradation within the at least one region.

5. The computing system of claim 1, wherein the neural network filter includes a generative neural network, and wherein the generative neural network predicts replacement data at points that, in the media data, provide features that enable an observer to discern the undesirable content, and wherein the neural network filter segments at least one region containing the undesirable content and predicts the replacement data within the at least one region.

6. The computing system of claim 1, wherein the undesirable content is made indiscernible using a media degradation technique.

7. The computing system of claim 1, wherein the instructions, when executed by the computing device processor, further enables the computing system to:

obtain restriction preferences associated with a user account; and classify the content as undesirable based on the restriction preferences.

8. The computing system of claim 1, wherein the instructions, when executed by the computing device processor, further enables the computing system to:

determine a location and a size of the undesirable content represented in the media data;

determine a replacement object;

scale the replacement object according to the size of the undesirable content; and overlay the replacement object at the location of the undesirable content.

9. The computing system of claim 1, wherein parameters for the neural network filter are stored within the memory device, and wherein the instructions, when executed by the computing device processor, further enables the computing system to:

obtain updated filter parameters; and update the neural network filter based on updated filter parameters.

10. The computing system of claim 1, wherein the instructions, when executed by the computing device processor, further enables the computing system to:

identify a set of filter parameters embedded with the media data, wherein the media data is filtered based on the set of filter parameters.

11. A media playing device, comprising:

an input buffer;

an output buffer;

a computing device processor; and a memory device including instructions that, when executed by the computing device processor, enables the media playing device to:

obtain media data from the input buffer, use a neural network filter to identify undesirable content represented in the media data, wherein the neural network performs an autoencoding to generate a feature vector, sets a value of a feature that represents undesirable content to zero, and performs a decoding of the feature vector, process the media data using the neural network filter to generate filtered media without the undesirable content, wherein the neural network filter performs autoencoding and autodecoding to generate the filtered media, and store the filtered media to the output buffer.

12. The media playing device of claim 11, wherein the neural network filter comprises at least one convolutional layer and at least one temporally recurrent layer.

13. The media playing device of claim 12, wherein the neural network filter segments at least one region containing the undesirable content and performs degradation within the at least one region.

14. The media playing device of claim 11, wherein the neural network filter includes a generative neural network, and wherein the generative neural network predicts replacement data at points that, in the media data, provide features that enable an observer to discern the undesirable content, and wherein the neural network filter segments at least one region containing the undesirable content and predicts the replacement data within the at least one region.

15. The media playing device of claim 11, wherein the undesirable content is made indiscernible using a media degradation technique.

16. The media playing device of claim 11, wherein the instructions, when executed by the computing device processor, further enables the media playing device to:

obtain restriction preferences associated with a user account; and classify the content as undesirable based on the restriction preferences.

17. The media playing device of claim 11, wherein the instructions, when executed by the computing device processor, further enables the media playing device to:

determine a location and a size of the undesirable content represented in the media data;

determine a replacement object;

scale the replacement object according to the size of the undesirable content; and overlay the replacement object at the location of the undesirable content.

18. The media playing device of claim 11, wherein parameters for the neural network filter are stored within the memory device, and wherein the instructions, when executed by the computing device processor, further enables the media playing device to:

obtain updated filter parameters; and update the neural network filter based on updated filter parameters.

\* \* \* \* \*